US008824028B2

(12) United States Patent  
Harada et al.

(10) Patent No.: US 8,824,028 B2
(45) Date of Patent: Sep. 2, 2014

(54) IMAGE READING APPARATUS AND IMAGE FORMING APPARATUS

(71) Applicant: KYOCERA Document Solutions Inc., Osaka (JP)

(72) Inventors: Hiroyuki Harada, Osaka (JP); Shinichi Kimura, Osaka (JP)

(73) Assignee: Kyocera Document Solutions Inc. (JP)

( * ) Notice: Subject to any disclaimer, the term of this patent is extended or adjusted under 35 U.S.C. 154(b) by 0 days.

(21) Appl. No.: 14/089,065

(22) Filed: Nov. 25, 2013

(65) Prior Publication Data

US 2014/0153070 A1    Jun. 5, 2014

(30) Foreign Application Priority Data

Nov. 30, 2012 (JP) ................................. 2012-262171
Dec. 27, 2012 (JP) ................................. 2012-284988

(51) Int. Cl.
*H04N 1/04* (2006.01)
*H04N 1/12* (2006.01)
*H04N 1/00* (2006.01)
*H04N 1/32* (2006.01)

(52) U.S. Cl.
CPC ........... *H04N 1/00013* (2013.01); *H04N 1/123* (2013.01); *H04N 1/0005* (2013.01); *H04N 1/00543* (2013.01); *H04N 1/00694* (2013.01); *H04N 1/00588* (2013.01); *H04N 1/00745* (2013.01); *H04N 1/3263* (2013.01); *H04N 1/00037* (2013.01)
USPC ........... 358/498; 358/496; 358/486; 271/228; 271/265.02

(58) Field of Classification Search
CPC .................. H04N 1/00745; H04N 2201/0081; H04N 1/12; H04N 1/00602; H04N 1/00718; H04N 1/121; H04N 1/00774; H04N 1/00779; H04N 2201/04732; H04N 2201/04737; H04N 1/00628; H04N 1/00748
USPC ........ 358/498, 1.13, 448, 488, 449, 474, 496, 358/486, 497, 505, 509; 271/264, 18, 271/10.01, 121, 225, 228, 258.01, 265.02, 271/3.19, 109, 10.11, 110, 111, 117, 271/265.04, 4.01, 10.02, 10.03, 10.1, 11, 271/114, 145, 253, 259, 262, 265.01, 3.14, 271/3.2, 42
See application file for complete search history.

(56) References Cited

U.S. PATENT DOCUMENTS 6,215,976 B1 * 4/2001 Shida et al. .................... 399/367
6,585,258 B1 * 7/2003 Hirota et al. .................. 271/186

(Continued)

FOREIGN PATENT DOCUMENTS

JP    2006-67242    3/2006

*Primary Examiner* — Negussie Worku
(74) *Attorney, Agent, or Firm* — Gerald E. Hespos; Michael J. Porco; Matthew T. Hespos

(57) ABSTRACT

An image reading apparatus includes an image reading unit for reading an image of a document at a reading position, a document feeding unit for discharging the document via the reading position, an abnormality detection unit for detecting a feeding abnormality, and a reading determination unit. The reading determination unit determines that the reading of the image of the fed document by the image reading unit is complete in a case where it is determined that a fed document, which is being fed by the document feeding unit, is not a final document, and it is detected that the leading edge of the fed document has reached the reading position, and when it is detected that the leading edge of the subsequent document has reached the reading position without the abnormality detection unit detecting any abnormality.

9 Claims, 10 Drawing Sheets

(56) References Cited

U.S. PATENT DOCUMENTS

| | | | |
|---|---|---|---|
| 6,594,039 B1* | 7/2003 | Kanbayashi | 358/491 |
| 6,646,768 B1* | 11/2003 | Andersen et al. | 358/474 |
| 7,327,502 B2* | 2/2008 | Sheng | 358/498 |
| 7,468,818 B2* | 12/2008 | Suzuki | 358/498 |
| 8,264,752 B2* | 9/2012 | Katsuyama | 358/498 |
| 8,625,174 B2* | 1/2014 | Yamazaki et al. | 358/498 |
| 8,654,364 B2* | 2/2014 | Ogasawara et al. | 358/1.13 |
| 8,711,450 B2* | 4/2014 | Ishikawa | 358/505 |
| 8,730,516 B2* | 5/2014 | Shimizu | 358/1.18 |
| 8,730,529 B2* | 5/2014 | Link et al. | 358/474 |
| 8,736,926 B2* | 5/2014 | Suzuki et al. | 358/498 |

* cited by examiner

IMAGE READING APPARATUS AND IMAGE FORMING APPARATUS

This application relates to and claims priority from Japanese Patent Application No. 2012-262171, filed with the Japan Patent Office on Nov. 30, 2012, and Japanese Patent Application No. 2012-284988, filed with the Japan Patent Office on Dec. 27, 2012, the entire disclosure of which is incorporated herein by reference.

BACKGROUND

The present disclosure relates to an image reading apparatus for reading a document image and an image forming apparatus having such an image reading apparatus, and in particular relates to technology for determining whether the reading of the image of the document, which is being fed, is complete.

Conventionally, known is an image forming apparatus including an automatic document feeder (ADF). An ADF includes a feeding unit for feeding a document mounted on a document tray to a reading part (reading position), and an openable/closeable outer cover (open/close cover) which covers the feeding unit. When a document is jammed (abnormality such as a paper jam) in the feeding unit, the user opens the outer cover and removes the document. Moreover, an ADF includes a safety switch (open/close detection sensor) for detecting the opening of the cover so that the user is not endangered as a result of the rollers of the feeding unit malfunctioning during the paper removal process with the outer cover open. The open/close detection sensor cuts off the power source of the ADF upon detecting that the cover is opened.

Nevertheless, there are low-priced image reading apparatuses that include an ADF, but do not include the foregoing open/close detection sensor. With this kind of apparatus, even when the open/close cover is opened during the reading of the image of the document, it is not possible to detect that the open/close cover has been opened. Thus, as a result of the open/close cover being opened during the reading of the image of the document, for example, there may be cases where the roller members for feeding the document will vibrate and cause the document to shift in a direction that is different from the normal feeding direction and be fed to the reading position, and thus disable the proper reading of the image of the document. Even in the foregoing case, the reading operation of the image of the document will be continued. In the foregoing case, there is a possibility that the image of the document will be read erroneously.

An object of the present disclosure is to inhibit the erroneous reading of an image of a document in an image reading apparatus, which does not include an open/close detection sensor of an open/close cover covering the feeding path of the document, in a state where the open/close cover is opened and the image of the document cannot be properly read.

SUMMARY

The image reading apparatus according to one aspect of the present disclosure includes a mounting part on which documents are mounted, an image reading unit, a document feeding unit, an open/close cover, a final document determination unit, a feed detection unit, an abnormality detection unit and a reading determination unit.

The image reading unit reads an image of a document at a predetermined reading position. The document feeding unit feeds, one document at a time, the documents mounted on the mounting part at a predetermined paper interval time, and discharging the documents via the reading position. The open/close cover openably/closeably covers a feeding path on which the documents are fed by the document feeding unit. The final document determination unit determines whether a fed document, which is the document that is being fed by the document feeding unit, is a final document among the documents mounted on the mounting part. The feed detection unit detects whether a leading edge or a trailing edge of the fed document has reached the reading position.

The abnormality detection unit detects an occurrence of an abnormality in a case where a reading time limit, which is longer than the paper interval time, is set in advance, the final document determination unit determines that the fed document is not the final document, and the feed detection unit detects that the trailing edge of the fed document has reached the reading position, and when the feed detection unit does not detect that a leading edge of a subsequent document, which is a document that is fed subsequent to the fed document, has reached the reading position during a period from the detection of the trailing edge of the fed document reaching the reading position until the reading time limit has elapsed.

The reading determination unit determines that the reading of the image of the fed document by the image reading unit is complete in a case where the final document determination unit determines that the fed document is not the final document, and the feed detection unit detects that the leading edge of the fed document has reached the reading position, and when the feed detection unit detects that the leading edge of the subsequent document has reached the reading position without the abnormality detection unit detecting any abnormality.

The image forming apparatus according to another aspect of the present disclosure includes the foregoing image reading apparatus, and an image forming unit for forming an image on recording paper based on an image read by the image reading unit of the image reading apparatus.

DETAILED DESCRIPTION

First Embodiment

Figure 1:
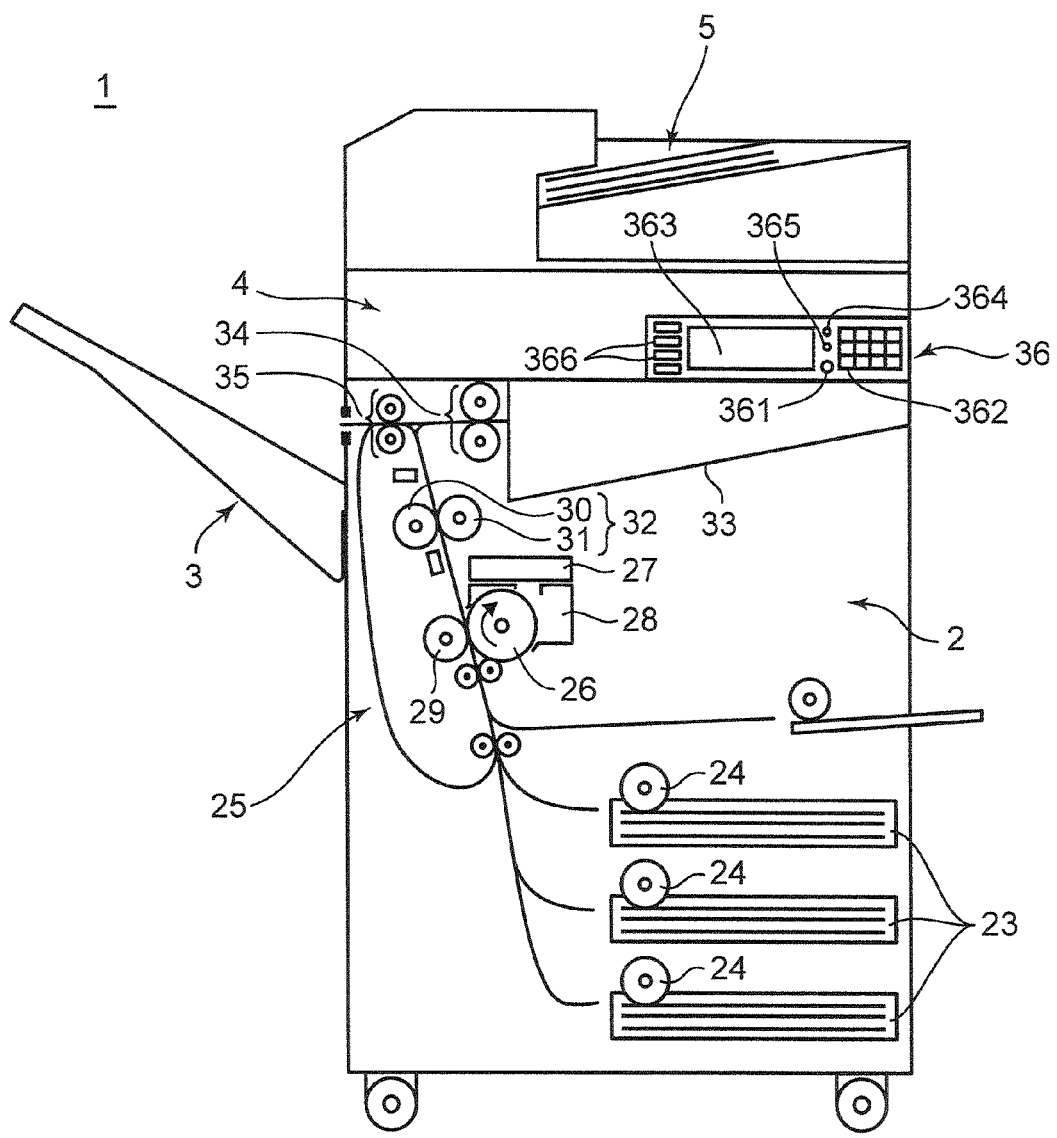
FIG. 1 is a schematic cross section of a complex machine as an example of the image forming apparatus including the image reading apparatus according to the present disclosure.

FIG. 1 is a schematic cross section of a complex machine 1 of the first embodiment as an example of an image forming apparatus including an image reading apparatus according to the present disclosure. The complex machine 1 includes a plurality of functions of a copier, printer, scanner, and so on, and includes a main body 2, a stack tray 3 disposed on the left side of the main body 2, an operation unit 36 for a user to input various operation commands, an image reading unit 4 disposed at the upper part of the main body 2, and a document feeding unit 5 disposed above the image reading unit 4.

The main body 2 includes a plurality of paper feed cassettes 23, a paper feed roller 24 for feeding, one sheet at a time, recording paper from the paper feed cassettes 23 to an image forming unit 25, and an image forming unit 25 for forming an image on the recording paper fed from the paper feed cassettes 23.

The image forming unit 25 is used for forming an image on the recording paper based on the image read by the image reading unit 4, and includes a photoconductive drum 26, an optical unit 27, a development unit 28, a transfer unit 29, a fixation device 32, and a feed roller pair 34, 35. The optical unit 27 outputs a laser beam or the like and exposes the photoreceptor drum 26 based on an image signal acquired by image reading unit 4. The development unit 28 forms a toner image on the photoconductive drum 26. The transfer unit 29 transfers, onto the recording paper, the toner image on the photoconductive drum 26. The fixation device 32 includes a pair of rollers 30 and 31 for heating the recording paper onto which the toner image was transferred and fixing the toner image onto the recording paper. The feed roller pair 34, 35 is provided on a sheet feeding path within the image forming unit 25, and feeds the recording paper to the stack tray 3 or the discharge tray 33.

The operation unit 36 includes a start key 361 for the user to input print execution commands, a numerical keypad 362 for inputting the number of print copies, a display unit 363, a reset key 364, a stop key 365 and a function switch key 366. The display unit 363 is configured from a liquid crystal display for displaying operation guide information of various copying operations, and has a touch panel function for inputting various settings. The reset key 364 resets the settings that were set with the display unit 363. The stop key 365 is a key for stopping the printing (image forming) operation that is being executed. The function switch key 366 is a key for switching between the copier function, the printer function, the scanner function and the facsimile function.

Figure 2:
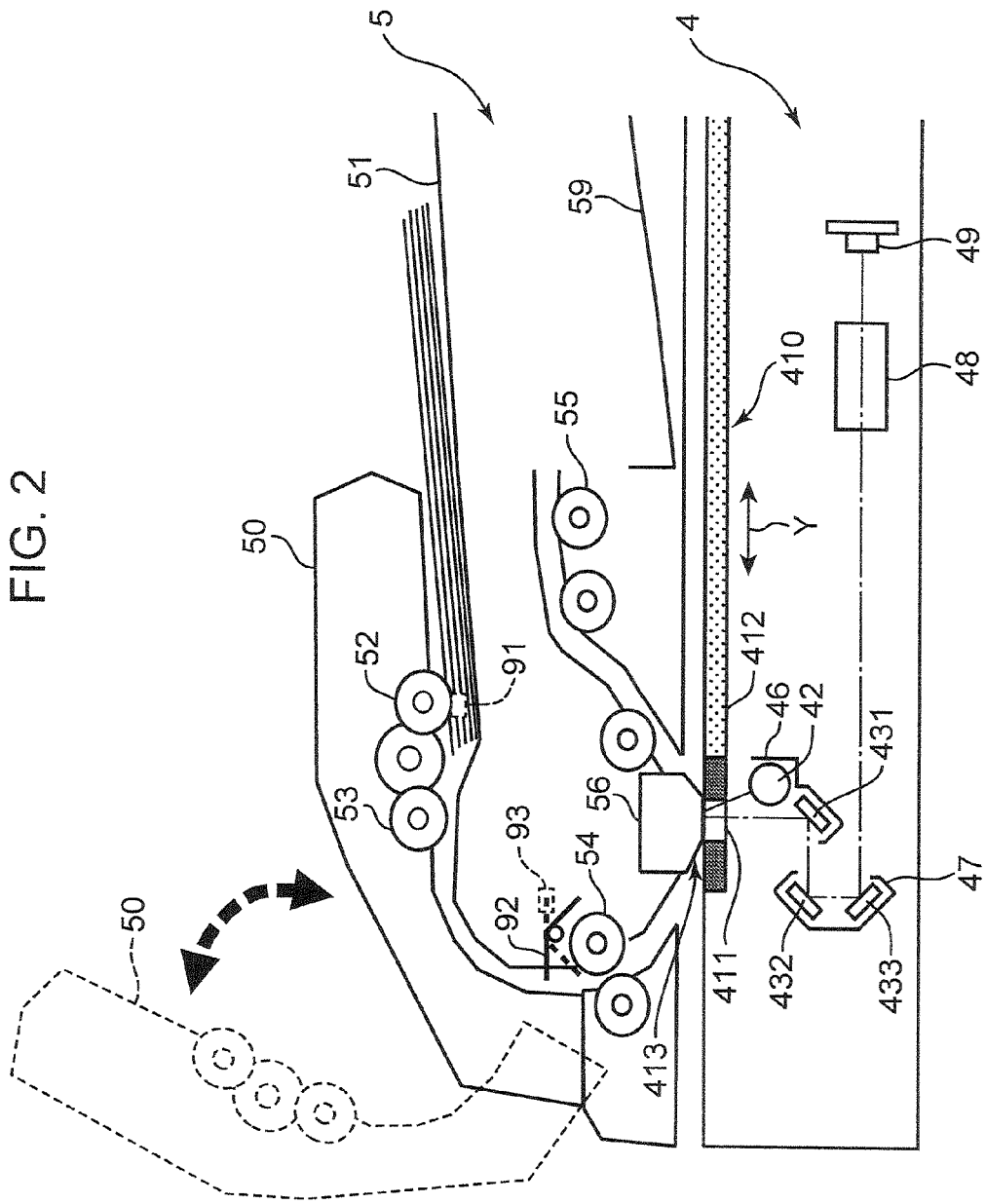
FIG. 2 is a schematic cross section of the image reading unit and the document feeding unit.

FIG. 2 is a schematic cross section of the image reading unit 4 and the document feeding unit 5. The image reading unit 4 optically acquires an image of a document at a predetermined reading position (reading position 413), and outputs an image signal. The image reading unit 4 includes a contact glass 410, a light source 42, a first mirror 431, a second mirror 432, a third mirror 433, a first carriage 46, a second carriage 47, an imaging lens 48, and a charge coupled device (CCD) 49. The light source 42 and the first mirror 431 are supported by the first carriage 46, and the second mirror 432 and the third mirror 433 are supported by the second carriage 47.

The contact glass 410 includes a broad document mounting glass 412, and an elongated automatic document reading glass 411 positioned on the left side of the document mounting glass 412 in FIG. 2.

As the image reading method of a document by the image reading unit 4, there are the following two methods; namely, a flatbed reading mode of reading an image of a document mounted on the document mounting glass 412, and an ADF reading mode of causing the document feeding unit 5 to feed a document and reading an image of the document when the document passes through the reading position 413.

Specifically, with the flatbed reading mode, the light source 42 causes the document mounted on the document mounting glass 412 to be irradiated. Light reflected from the document is reflected in order from the first mirror 431, the second mirror 432, and the third mirror 433, and enters the imaging lens 48. The light that entered the imaging lens 48 is imaged on a light-receiving face of the CCD 49. The light is subjected to photoelectric conversion in the CCD 49, and output as an image signal. When one line worth of reading is complete, the first carriage 46 and the second carriage 47 are moved in a direction (sub scanning direction, arrow Y direction) which is perpendicular to the main scanning direction (vertical direction relative to the plane of paper of FIG. 2) of the document, and the subsequent line is read.

Meanwhile, with the ADF reading mode, as described above, when the document fed by the document feeding unit 5 passes through the reading position 413, which is a gap between the automatic document reading glass 411 and the reading guide 56, the light source 42 emits light to the document through the automatic document reading glass 411. The reflected light from the document is reflected in order from the first mirror 431, the second mirror 432, and the third mirror 433, and then enters the imaging lens 48. The light that entered the imaging lens 48 is imaged on a light-receiving face of the CCD 49. The light is subjected to photoelectric conversion in the CCD 49, and output as an image signal. When one line worth of reading is complete, the document is fed by the document feeding unit 5, and the subsequent line is read.

The document feeding unit 5 includes, as shown in FIG. 2, an open/close cover 50, a document tray 51 (mounting part), a pickup roller 52, a separation roller 53, a resist roller 54, a reading guide 56, a discharge roller 55, and a document discharge tray 59, and configures the auto document feeder (ADF). The document feeding unit 5 feeds the document mounted on the document tray 51 via the reading position 413, and discharges the document to the document discharge tray 59. Moreover, the document feeding unit 5 includes a document detection sensor 91, an actuator 92, and a reading detection sensor 93.

The open/close cover 50 is a cover for openably/closeably covering a feeding path on which the document is fed by the document feeding unit 5. For example, when an abnormality such as a paper jam occurs in the feeding path, the user can open the open/close cover 50 (state shown with the broken line of FIG. 2), and remove the document from the feeding path. Note that the document feeding unit 5 of this embodiment is not provided with an open/close detection sensor for detecting the opening of the open/close cover 50.

The document tray 51 is the place where one or more documents are mounted. A bottom face of the document tray 51 is provided, for example, with a lifting mechanism not shown for lifting the document upward with a method of moving the lifting plate based on an upward biasing force. When a document is mounted on the document tray 51, the lifting plate is lifted by the lifting mechanism, and the uppermost document comes into contact with the pickup roller 52.

The pickup roller 52 comes into contact with the uppermost document of the document tray 51, is rotatably driven, and sends the uppermost document, one document at a time, toward the separation roller 53. The pickup roller 52 starts sending the subsequent document after a predetermined paper interval time has elapsed from the time that the trailing edge of the preceding document has been sent. In other words, the pickup roller 52 feeds, one document at a time, the documents mounted on the document tray 51 at a predetermined paper interval time. The paper interval time is the time from a time that the trailing edge of the document, which is being fed, passes through the pickup roller 52 to a time that the leading edge of the subsequent document passes through the pickup roller 52 and, for example, is pre-set to a time in which a feeding abnormality such as a paper jam will not occur during the feeding of the document based on experimental values of test operations and the like.

The separation roller 53 feeds, one document at a time, the documents that are fed from the pickup roller 52 toward the resist roller 54. The resist roller 54 forms a nip with a facing roller, and sends the fed document to the reading position 413 at an adjusted predetermined timing.

The reading guide 56 is disposed downstream of the resist roller 54 and so as to face the contact glass 410 of the image reading unit 4. The reading guide 56 is long in the width direction (main scanning direction) of the document and, for example, is pressed against the contact glass 410 by the biasing force of the coil spring or the like provided to both ends thereof in the longitudinal direction. With the lower face of the reading guide 56, both ends in the longitudinal direction protrude more downward than the center portion, and both ends in the longitudinal direction come into contact with the contact glass 410 when the document feeding unit 5 is in a closed posture. The document passes through a given gap that is formed between the center portion of the reading guide 56 and the contact glass 410. In other words, with the foregoing ADF reading mode, the image face of the document is read when the document passes through between the reading guide 56 and the automatic document reading glass 411.

The discharge roller 55 is disposed more downstream than the reading position 413 in the document feeding direction, and discharges, to the document discharge tray 59, the document that were read by the reading position 413. The document discharge tray 59 has a mounting face for receiving the discharged documents. This mounting face is positioned below the discharge roller 55 when near the discharge roller 55, and has a shape of inclining upward along the discharging direction.

The document detection sensor 91 is disposed in the vicinity below the pickup roller 52 on either side face in the document feeding unit 5 (either side face in the vertical direction relative to the plane of paper in FIG. 2), and is configured as a light transmission sensor including a light-emitting element and a light-receiving element. The document detection sensor 91 outputs a low-level detection signal indicating that a document is mounted, based on the light-receiving element, since the light emitted from the light-emitting element is blocked by the document when a document is mounted on the document tray 51 and the uppermost document is in contact with the pickup roller 52. Meanwhile, when a document is not mounted on the document tray 51, the document detection sensor 91 outputs a high-level detection signal indicating that a document is not mounted, based on the light-receiving element, since the light emitted from the light-emitting element is received by the light-receiving element.

Note that the document detection sensor 91 is not limited to the foregoing configuration, and may also be configured from a light reflection sensor. Moreover, the document detection sensor 91 is not limited to an optical sensor, and may also be configured from a mechanical sensor. As a mechanical sensor, for example, illustrated may be a configuration in which an actuator, which is biased upward with a spring or the like provided to the bottom face of the document tray 51, detects that the document is mounted on the document tray 51 by coming into contact with the document and moving downward.

The actuator 92 is rotatably supported by the rotating axis extending in the width direction of the document (main scanning direction, direction that is vertical relative to the plane of paper of FIG. 2). The actuator 92 has a substantial "V" shape in a width direction view of the document, and one end thereof is protruding on the feeding path of the document at a predetermined position on a side that is more upstream than the resist roller 54 in the feeding direction of the document. When the foregoing one end of the actuator 92 comes into contact with the document that was fed by the document feeding unit 5, the one end side turns downward pursuant to the document feeding operation.

The reading detection sensor 93 is disposed on either side face in the document feeding unit 5 (either side face in a vertical direction relative to the plane of paper of FIG. 2), and is configured as a light transmission sensor including the light-emitting element and the light-receiving element. The reading detection sensor 93 is provided, as shown with the dotted line portion of FIG. 2, at a position that is the same height as the other end of the actuator 92 when the foregoing one end of the actuator 92 is in a state of turned downward pursuant to the document feeding operation.

The reading detection sensor 93 outputs a high-level detection signal while the light emitted from the light-emitting element toward the light-receiving element is not being blocked. Meanwhile, the reading detection sensor 93 outputs a low-level detection signal while the light emitted from the light-emitting unit toward the light-receiving unit is being blocked by the foregoing other end of the actuator 92.

In other words, when the leading edge of the fed document comes into contact with the foregoing one end of the actuator 92 and the leading edge of the document is fed toward the resist roller 54, as shown with the dotted line portion of FIG. 2, the one end of the actuator 92 turns downward. Meanwhile, the other end of the actuator 92 turns up to the same height as the reading detection sensor 93. Consequently, the light emitted from the light-emitting unit of the reading detection sensor 93 toward the light-receiving unit is blocked, and the detection signal output from the reading detection sensor 93 is switched from a high level to a low level.

Meanwhile, when the trailing edge of the document passes the resist roller 54 and the one end of the actuator 92 is no longer in contact with the document, as shown with the solid line portion of FIG. 2, the one end of the actuator 92 turns upward by returning to the original position. Meanwhile, the other end of the actuator 92 turns downward from the position of the same height as the reading detection sensor 93. Consequently, the light emitted from the light-emitting unit of the reading detection sensor 93 toward the light-receiving unit is no longer blocked, and the detection signal output from the reading detection sensor 93 is switched from a low level to a high level.

Note that the reading detection sensor 93 is not limited to the foregoing configuration, and may also be configured from a light reflection sensor.

The document feeding unit 5 also functions as a document holding member. For example, the document feeding unit 5 is rotatably supported by the main body 2 at a hinge part not shown on the back face side of the complex machine 1 (back side of the plane of paper in FIG. 1 and FIG. 2). This kind of document feeding unit 5 can take on a closed posture of covering the contact glass 410, and an open posture of exposing the contact glass 410. In the foregoing flatbed reading mode, the document feeding unit 5 is caused to be in a closed posture and hold down the document mounted on the document mounting glass 412, and the image face of the document is read based on the user's operation of the operation unit 36.

Figure 3:
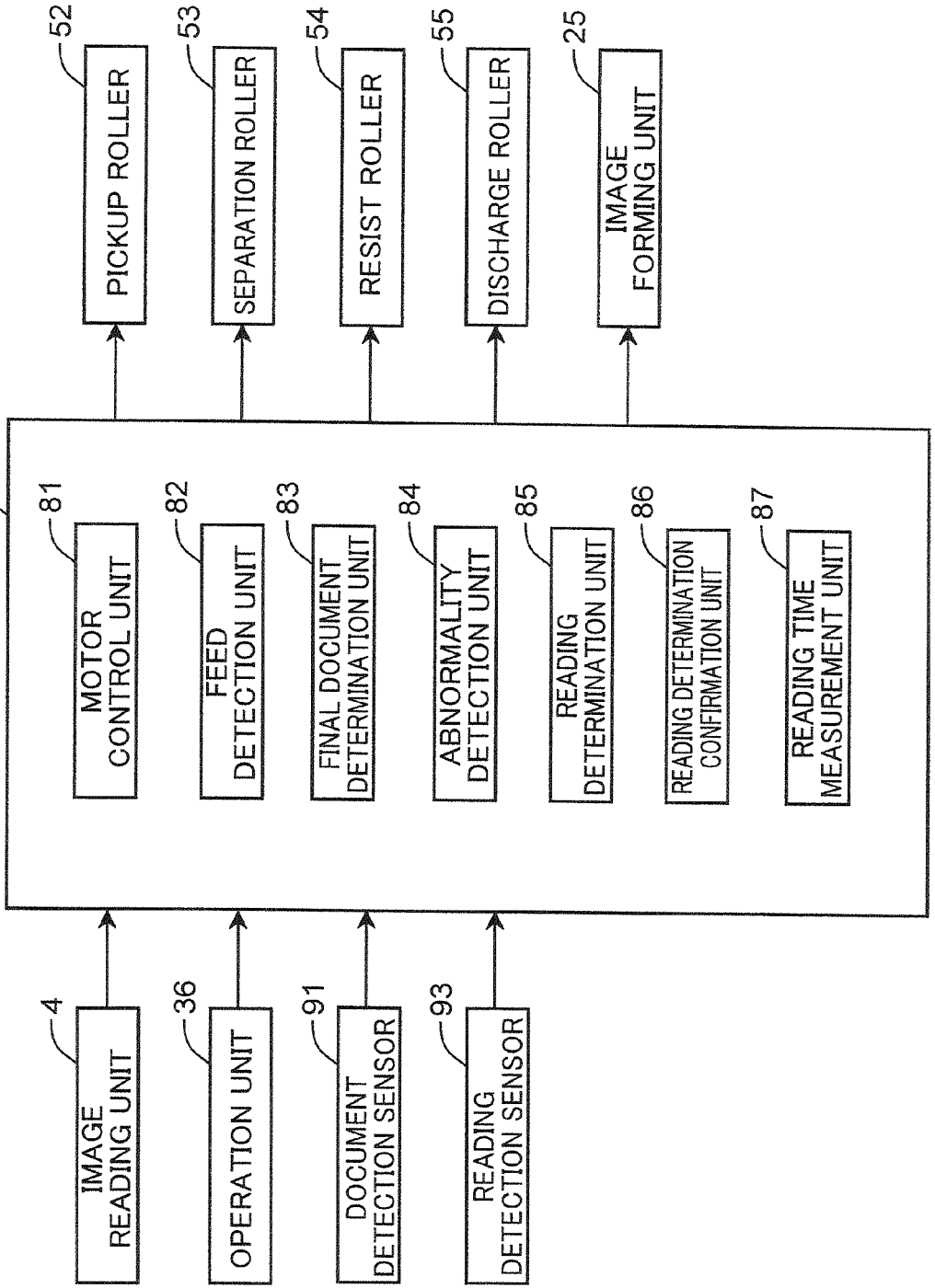
FIG. 3 is a block diagram showing the electrical configuration of the complex machine according to the first embodiment.

The electrical configuration of the complex machine 1 according to the first embodiment is now explained with reference to FIG. 3. The complex machine 1 includes a controller 80 which governs the operational control of the respective units of the complex machine 1. The controller 80 is configured, for example, from a microcomputer having a CPU and a memory such as a ROM or a RAM, and performs the operational control of the respective units by causing the CPU to execute the various control programs stored in the memory.

The controller 80 is connected, in a mutually communicable manner, to the foregoing image reading unit 4, the operation unit 36, various detection sensors 91, 93, various rollers 52, 53, 54, 55, and the image forming unit 25.

The controller 80 controls the document feeding operation by the document feeding unit 5 by causing the CPU to execute the control programs that function as a motor control unit 81, a feed detection unit 82, a final document determination unit 83, an abnormality detection unit 84, a reading determination unit 85, a reading determination confirmation unit 86, and a reading time measurement unit 87.

The motor control unit 81 outputs a drive signal to the respective motors not shown for driving the various rollers 52, 53, 54, 55, and performs control for rotatably driving the various rollers 52, 53, 54, 55 at a predetermined speed, respectively. Note that each motor is configured, for example, as a stepping motor, and is rotatably driven at a predetermined according to the number of pulses of the drive signal.

The feed detection unit 82 detects that the leading edge or the trailing edge of the document, which is being fed by the document feeding unit 5, has reached the reading position 413 by driving of the various rollers 52, 53, 54, 55.

Specifically, the feed detection unit 82 detects that the leading edge of the document has reached the reading position 413 when the number of pulses of the drive signal of the motor driving the resist roller 54 reaches a predetermined number of pulses after the detection signal output from the reading detection sensor 93 changes from a high-level signal to a low-level signal; that is, after the leading edge of the document reaches a predetermined position that is more upstream than the resist roller 54 in the document feeding direction.

Similarly, the feed detection unit 82 detects that the trailing edge of the document has reached the reading position 413 when the number of pulses of the drive signal of the motor driving the resist roller 54 reaches a predetermined number of pulses after the detection signal output from the reading detection sensor 93 changes from a low-level signal to a high-level signal; that is, after the trailing edge of the document reaches a predetermined position that is more upstream than the resist roller 54 in the document feeding direction.

The number of pulses is the number of pulses of the drive signal required to rotate the drive motor of the resist roller 54 for feeding the document a predetermined distance from a predetermined position that is more upstream than the resist roller 54 up to the reading position 413 and, for example, is pre-set based on experimental values of test operations and the like.

The final document determination unit 83 determines whether the fed document, which is a document that is being fed by the document feeding unit 5, is a final document among the one or more documents mounted on the document tray 51. Details of the determination processing regarding whether the fed document is the final document by the final document determination unit 83 will be described later.

The abnormality detection unit 84 receives, in advance, the setting of a reading time limit that is longer than the paper interval time. The abnormality detection unit 84 detects an occurrence of an abnormality in the document feed when the final document determination unit 83 determines that the fed document is not the final document, and the feed detection unit 82 detects that the trailing edge of the fed document has reached the reading position 413, and the feed detection unit 82 does not detect a leading edge of a subsequent document, which is a document that is fed subsequent to the fed document, has reached the reading position 413 during a period from the detection of the trailing edge of the fed document reaching the reading position 413 until the reading time limit has elapsed.

The reading time limit is set so that it is not excessively long while ensuring the time required for the leading edge of the subsequent document to reach the reading position 413 after the trailing edge of the fed document reaches the reading position 413. Specifically, the reading time limit is set to a time in which a time, as a surplus for a measurement error, is added to the foregoing paper interval time that is the time interval of feeding the documents from the pickup roller 52.

The reading determination unit 85 determines that the reading of the image of the fed document by the image reading unit 4 is complete in a case where the final document determination unit 83 determines that the fed document is not the final document, and the feed detection unit 82 detects that the leading edge of the fed document has reached the reading position 413, and when the feed detection unit 82 detects that the leading edge of the subsequent document has reached the reading position 413 without the abnormality detection unit 84 detecting any abnormality.

The reading determination confirmation unit 86 performs processing of urging the user to make a confirmation input on whether the reading of the image of the fed document by the image reading unit 4 has ended in a failure. The reading determination confirmation unit 86 displays, on the display unit 363, an operation screen of the confirmation input for urging the user to make the confirmation input when the final document determination unit 83 determines that the fed document is the final document, and an elapsed time from the time that the feed detection unit 82 detects that the leading edge of the final document has reached the reading position 413 to the time that the feed detection unit 82 detects that the trailing edge of the final document has reached the reading position 413 is shorter than a predetermined reading time per document.

The reading time measurement unit 87 measures an actual reading time which is a time from the time that the feed detection unit 82 detects that the leading edge of the fed document has reached the reading position 413 to the time that the feed detection unit 82 detects that the trailing edge of the fed document has reached the reading position 413; that is, the time required for reading one fed document, and stores the actual reading time in the memory.

Note that, as the reading time per document that is used in the control of the reading determination confirmation unit 86, for example, set is the minimal value or the average value of the actual reading time measured by the reading time measurement unit 87 when one or more documents are read by the image reading unit 4. However, the reading time per document is not limited to the above. For example, when a document of a size (for example, A4) of a certain reference based on experimental values of test operations and the like is fed by the document feeding unit 5, the time from a time that the feed detection unit 82 detects that the leading edge of the document has reached the reading position 413 to a time that the feed detection unit 82 detects that the trailing edge of that document has reached the reading position 413 may be set as a reading time per document in a fixed value.

Figure 4:
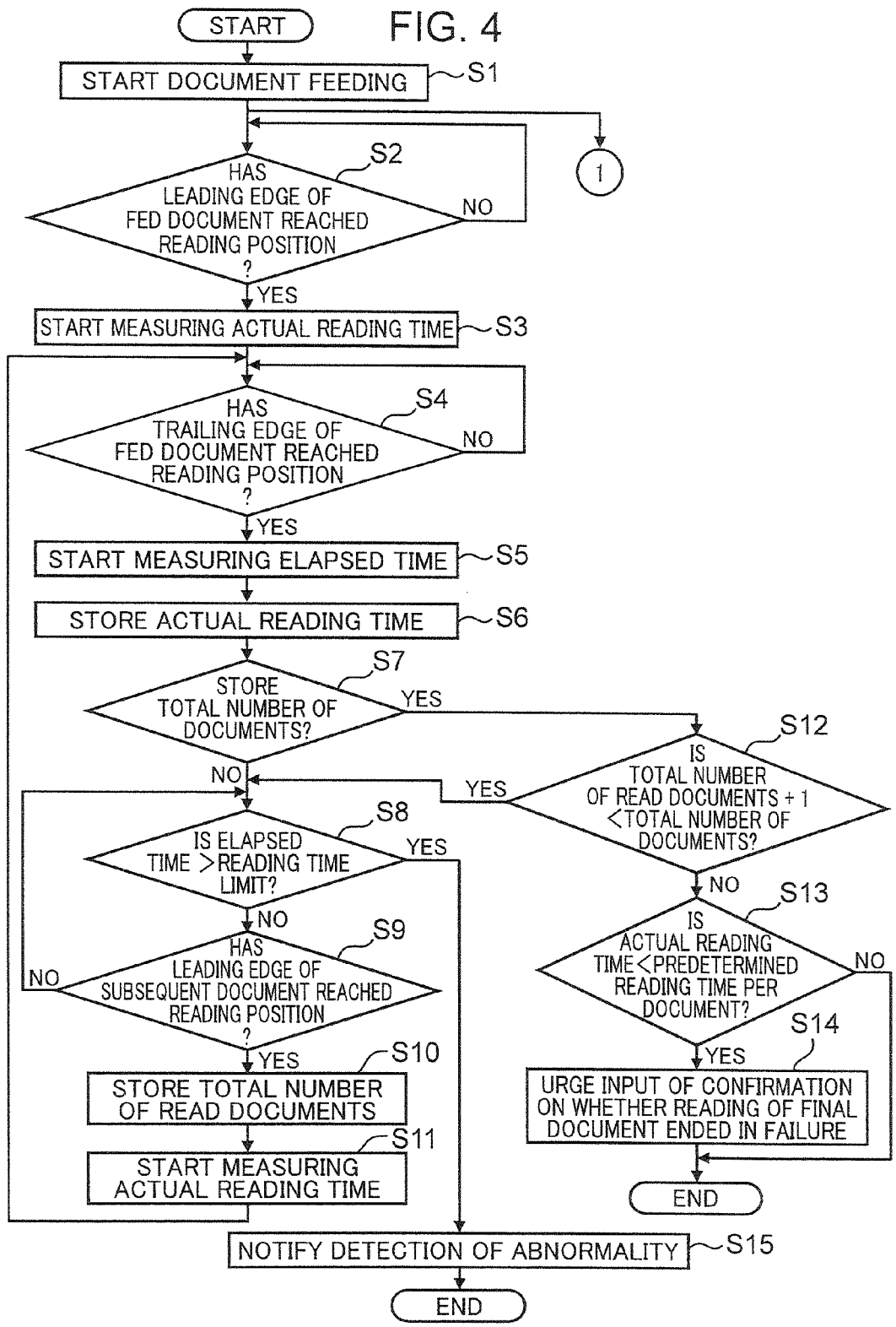
FIG. 4 is a flowchart showing the document feeding operation in the first embodiment.
Figure 5:
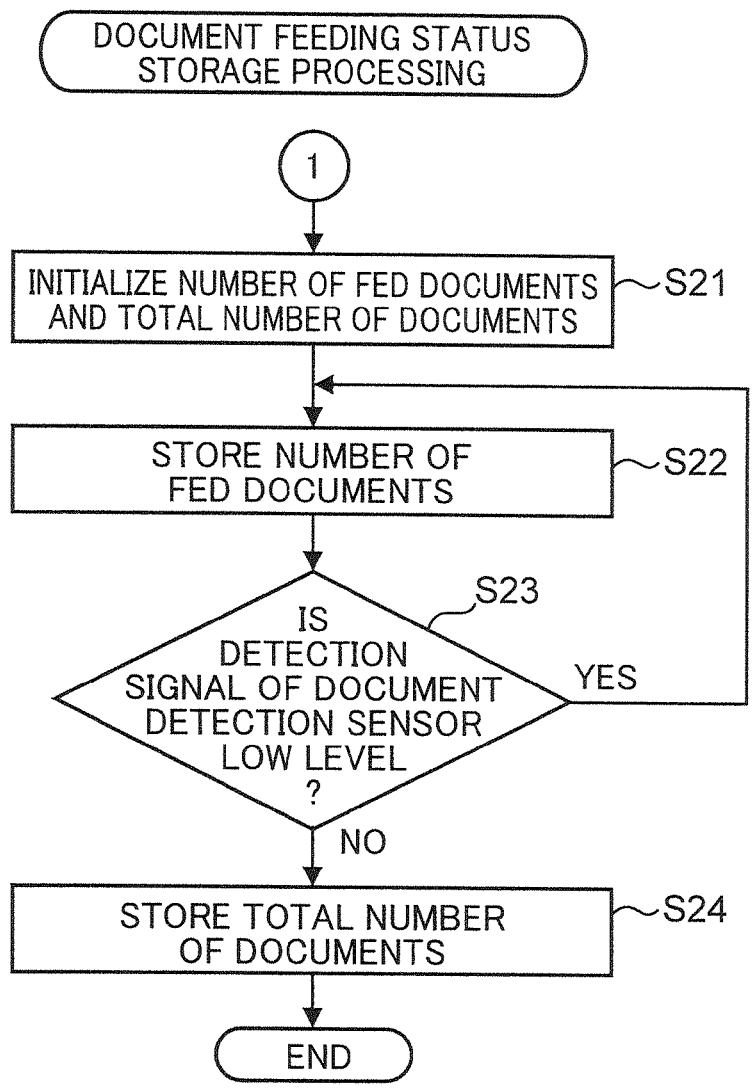
FIG. 5 is a flowchart showing the document feeding status storage processing in the document feeding operation.

The flow of the document feeding operation using the document feeding unit 5 is now explained with reference to FIG. 4 and FIG. 5. FIG. 4 is a flowchart showing the document feeding operation in the first embodiment, and FIG. 5 is a flowchart showing the document feeding status storage processing that is performed during the document feeding operation.

As shown in FIG. 4, when the document reading operation in the ADF reading mode is started by the controller 80, for example, based on the copy function execution command input from the operation unit 36, the motor control unit 81 starts driving the drive motor of the various rollers 52, 53, 54, 55, and starts feeding the uppermost document of the document tray 51 (S1).

After step S1 is executed, the final document determination unit 83 starts the document feeding status storage processing shown in FIG. 5 in parallel with the processing of step S2 onward described later.

When the final document determination unit 83 starts the document feeding status storage processing, the final document determination unit 83 deletes (initializes) the number of fed documents described later and the total number of documents described later if they are stored in the memory (S21). Subsequently, the final document determination unit 83 counts up the number of fed documents each time a document is fed by the pickup roller 52, and stores, in the memory, the number of documents after the foregoing count-up as the number of fed documents (S22). Subsequently, the final document determination unit 83 causes the document detection sensor 91 to detect whether a document is mounted on the document tray 51 (S23).

In step S23, when it is detected that a document is not mounted on the document tray 51 as a result of a low-level detection signal not being output from the document detection sensor 91 (S23; NO); that is, when all documents mounted on the document tray 51 have been fed by the pickup roller 52, the final document determination unit 83 stores, in the memory, the number of fed documents stored in the memory in step S22 as the total number of documents (total number of documents) (S24). In step S23, when it is detected that a document is mounted on the document tray 51 as a result of a low-level detection signal being output from the document detection sensor 91 (S23; YES); that is, when a document that has not been fed by the pickup roller 52 exists in the document tray 51, the final document determination unit 83 counts the number of documents that were fed by returning to step S22.

Returning to FIG. 4, after step S1 is executed, during the period until the feed detection unit 82 detects that the leading edge of the fed document, which is a document that is being fed, reaches the reading position 413 (S2; NO), the document is fed by the motor control unit 81 driving the drive motor of the various rollers 52, 53, 54, 55. Subsequently, when the feed detection unit 82 detects that the leading edge of the fed document, which is a document that is being fed, reaches the reading position 413 (S2; YES), the controller 80 causes the image reading unit 4 to start reading the image of the fed document. Moreover, the reading time measurement unit 87 uses, for example, a timer circuit or the like not shown to start measuring the elapsed time from the time that the leading edge of the fed document reaches the reading position 413 in step S2. In other words, the reading time measurement unit 87 thereby starts measuring the actual reading time of the fed document (S3).

When the feed detection unit 82 detects that the trailing edge of the fed document has reached the reading position 413 (S4; YES), the abnormality detection unit 84 uses, for example, a timer circuit or the like not shown to start measuring the elapsed time from the time that the trailing edge of the fed document has reached the reading position 413 in step (S5). Moreover, the reading time measurement unit 87 ends the measurement of the elapsed time which was started in step S3 at the point in time it is detected that the trailing edge of the fed document has reached the reading position 413, and stores the elapsed time of the measurement result as the actual reading time of the fed document in the memory (S6).

Subsequently, when the total number of documents is not stored in the memory based on the document feeding status storage processing which is being performed in parallel (S7; NO), the final document determination unit 83 determines that the fed document is not the final document since the processing of step S24 is not being performed in parallel; that is, since it is a state in which the document is detected as being mounted on the document tray 51 in step S23 (FIG. 5) (S23; YES).

When the final document determination unit 83 determines that the fed document is not the final document (S7; NO) and the measurement value of the elapsed time for which measurement was started in step S5 has exceeded a predetermined reading time limit (S8; YES), the abnormality detection unit 84 determines that an abnormality has occurred during the reading of the image of the fed document. Subsequently, the abnormality detection unit 84 notifies the user that an abnormality has occurred, for example, by displaying, on the display unit 363, a message to the effect that the occurrence of an abnormality has been detected (S15). The document feeding unit 5 thereafter ends the document feed processing.

Meanwhile, in step S8, when the measurement value of the elapsed time for which measurement was started in step S5 has not exceeded a predetermined reading time limit (S8; NO), the processing repeats returning to step S8 during the period while the feed detection unit 82 does not detect that the leading edge of the subsequent document, which is a document subsequent to the fed document, has reached the reading position 413 (S9; NO). In subsequent step S9, when the feed detection unit 82 detects that the leading edge of the subsequent document has reached the reading position 413 (S9; YES), the reading determination unit 85 determines that the reading of the image of the fed document is complete. Subsequently, the reading determination unit 85 counts up the number of documents that have been read, and stores the counted up number of documents as the number of documents that have been read in the memory (S10).

The reading time measurement unit 87 starts measuring the elapsed time from the time that it was detected that the leading edge of the subsequent document has reached the reading position 413 in step S9. In other words, the reading time measurement unit 87 consequently starts measuring the actual reading time of the subsequent document (S11). Subsequently, the reading determination unit 85 advances the processing to step S4 with the subsequent document (document that is subsequent to the fed document), in which the leading edge reaching the reading position is detected in step S9, as the fed document. The feed detection unit 82 detects, in step S4, whether the trailing edge of the document, which is now the new fed document, has reached the reading position 413. Note that, in step S6 to be performed subsequently, the measurement value of the elapsed time for which measurement was started in step S11 is used as the actual reading time.

In step S7, even in cases when the total number of documents is stored in the memory based on the document feeding status storage processing which is being performed in parallel; that is, even when all documents mounted on the document tray 51 have been fed by the pickup roller 52 (S7; YES), there are cases when the number of documents obtained by adding a number of one document in which the leading edge of the document has been confirmed as reaching the reading position in step S2 to the number of documents that have been read stored in the memory is less than the total number of documents stored in the memory (S12; YES). For example, this is a case where, when the size of the document is small, and, while all documents mounted on the document tray 51 have been fed by the pickup roller 52, the document that is being fed reaches the reading position 413 in a state where a plurality of documents exist on the feeding path. Accordingly, the final document determination unit 83 also determines that the fed document is not the final document in the foregoing case (S12; YES).

When final document determination unit 83 determines that the fed document is not the final document (S12; YES), and the measurement value of the elapsed time for which measurement was started in step S5 exceeds a predetermined reading time limit (S8; YES), the abnormality detection unit 84 determines that an abnormality has occurred during the reading of the image of the fed document. Subsequently, the abnormality detection unit 84 notifies the user that the occurrence of an abnormality has been detected (S15). The document feeding unit 5 thereafter ends the document feed processing.

Meanwhile, in step S7, in cases where the total number of documents is stored in the memory based on the document feeding status storage processing which is being performed in parallel (S7; YES), and the number of documents obtained by adding a number of one document in which the leading edge of the document has been confirmed as reaching the reading position in step S2 to the number of documents that have been read stored in the memory has reached the total number of documents stored in the memory (S12; NO), the final document determination unit 83 determines that the fed document is the final document.

When the determination is NO in S12, when the actual reading time corresponding to the final document stored in the memory by the reading time measurement unit 87 in step S6 is shorter than the predetermined reading time per document (S13; YES), the reading determination confirmation unit 86 urges the user to make a confirmation input on whether the reading of the image of the final image has ended in a failure by displaying, on the display unit 363, a screen which urges the user to make a confirmation input on whether the reading of the image of the final document has ended in a failure (S14). The document feeding unit 5 thereafter ends the document feed processing.

Note that the reading determination confirmation unit 86 sets, before the execution of step S13, the actual reading time of a minimal value among the actual reading times corresponding to the documents that were fed before the final document and stored in the memory based on the execution of step S6 as the reading time per document that is used in step S13. However, without limitation to the above, the reading determination confirmation unit 86 may also set the average value of the actual reading time corresponding to the documents that were fed before the final document as the reading time per document that is used in step S13.

Moreover, rather than setting the reading time per document during the reading of the document, it may also be set in advance before reading the document. For example, when a document of a size (for example, A4) of a certain reference based on experimental values of test operations and the like is fed by the document feeding unit 5, the time from a time that the feed detection unit 82 detects that the leading edge of the document has reached the reading position 413 to a time that the feed detection unit 82 detects that the trailing edge of that document has reached the reading position 413 is stored in advance in the ROM. In the foregoing case, the reading determination confirmation unit 86 uses the time that was stored in the ROM before the execution of step S13 as the reading time per document that is used in step S13.

Meanwhile, when the actual reading time corresponding to the final document stored in the memory by the reading time measurement unit 87 in step S6 is the predetermined reading time per document or greater (S13; NO), the reading determination confirmation unit 86 determines that the reading of the image of the final document is complete. The document feeding unit 5 thereafter ends the document feed processing.

As described above, the abnormality detection unit 84 determines that an abnormality has occurred during the reading of the image of the fed document in cases where the final document determination unit 83 determines that the fed document is not the final document (S7; NO or 512; YES), and the feed detection unit 82 detects that the trailing edge of the fed document has reached the reading position 413 (S4; YES), and the feed detection unit 82 does not detect that the leading edge of the subsequent document has reached the reading position 413 during the period from the time that it is detected that the trailing edge of the fed document has reached the reading position 413 until the reading time limit has elapsed (S9; NO, S8; YES) (S15).

The reading determination unit 85 determines that the reading of the image of the fed document is complete in cases where the final document determination unit 83 detects that the fed document is not the final document (S7; NO or S12; YES), and the feed detection unit 82 detects that the leading edge of the fed document has reached the reading position 413 (S2; YES), and the feed detection unit 82 detects that the leading edge of the subsequent document has reached the reading position 413 without the abnormality detection unit 84 detecting any abnormality from the time that it is detected that the leading edge of the fed document has reached the reading position 413 (S8; NO, S9; YES) (S10).

The reading determination confirmation unit 86 displays, on the display unit 363, an operation screen of the confirmation input for urging the user to make the confirmation input on whether the reading of the image of the final document has ended in a failure when the final document determination unit 83 determines that the fed document is the final document (S12; NO), and an elapsed time from the time that the feed detection unit 82 detects that the leading edge of the final document has reached the reading position 413 to the time that the feed detection unit 82 detects that the trailing edge of the final document has reached the reading position 413 is shorter than a predetermined reading time per document (S13; YES) (S14).

In other words, an example of the image reading apparatus according to the present disclosure is configured by configuring the document tray 51, the image reading unit 4, the document detection sensor 91, the actuator 92, the reading detection sensor 93, the document feeding unit 5, the feed detection unit 82, the final document determination unit 83, the abnormality detection unit 84, the reading determination unit 85, the reading determination confirmation unit 86, and the reading time measurement unit 87.

Meanwhile, when the open/close cover 50 is opened after the leading edge of the fed document reaches the reading position 413 and the image reading unit 4 starts reading the image of the fed document, there are cases when a problem occurs in the reading of the document image. For example, there may be cases where the resist roller 54 will vibrate and cause the document to shift in a direction that is different from the normal feeding direction and be fed to the reading position 413, and thus disable the proper reading of the image of the document by the image reading unit 4.

According to the configuration of the foregoing embodiment, in cases where the final document determination unit 83 determines that the fed document is not the final document (step S7; NO or step S12; YES), as described above, when the leading edge of the subsequent document does not reach the reading position 413 during the period until the reading time limit has elapsed from the time that it is detected that the trailing edge of the fed document has reached the reading position 413 as a result of the open/close cover 50 remaining in an open state during the reading of the image of the fed document (step S9; NO, step S8; YES), the abnormality detection unit 84 detects the occurrence of an abnormality (step S15). In other words, even without having to provide an open/close detection sensor for detecting the open/close state of the open/close cover 50, as described above, it is possible to appropriately detect, as a state in which an abnormality has occurred, a state in which the image of the document cannot be read properly.

In cases where the final document determination unit 83 determines that the fed document is not the final document (step S7; NO or step S12; YES) and the feed detection unit 82 detects that the leading edge of the fed document has reached the reading position 413 (step S2; YES), and the image reading unit 4 consequently starts reading the image of the fed document, when the feed detection unit 82 detects that the leading edge of the subsequent document has reached the reading position 413 without any abnormality being detected by the abnormality detection unit 84 (step S8; NO, step S9; YES), the reading determination unit 85 determines that the reading of the image of the fed document by the image reading unit 4 is complete (step S10).

In other words, as a result of the leading edge of the subsequent document reaching the reading position 413 without any abnormality being detected by the abnormality detection unit 84 and the image reading unit 4 consequently starting the reading of the image of the subsequent document, it is possible to reliably determine that the reading of the image of the fed document before the subsequent document was completed normally. It is thereby possible to avoid erroneously determining that the reading is complete in a state where the reading of the image of the fed document has not been completed normally. Accordingly, it is possible to reduce the risk of the image reading unit 4 erroneously reading the image of the document in a state where the open/close cover 50 is open and the image of the document cannot be read normally.

Moreover, since the reading of the image is inhibited in a state where the open/close cover 50 is opened, it is possible to reduce the risk of the image forming unit 25 using an erroneously read image to form an image on a sheet. It is thereby possible to reduce the risk of consuming the sheets unnecessarily.

Moreover, when the final document determination unit 83 determines that the fed document is the final document (S12; NO), there are cases where the reading time of the image of the final document is shorter than the predetermined reading time per document. In the foregoing case, it is not possible to automatically determine whether the size of the final document is smaller than the anticipated size or, the reading processing was ended midway, for example, as a result of the document shifting in a direction that is different from the normal feeding direction and being fed to the reading position 413 as a result of the open/close cover 50 being opened during the reading and the trailing edge of the document reaching the reading position 413 earlier than normal.

Nevertheless, according to the configuration of the foregoing embodiment, when the reading time of the image of the final document is shorter than the predetermined reading time per document (step S13; YES), the reading determination confirmation unit 86 can urge the user to make a confirmation input on whether the reading of the image of the document, which is being fed, has ended in a failure (step S14). If is thereby possible to cause the user to determine whether the reading of the image of the final document has ended in a failure.

Moreover, the reading time measurement unit 87 measures the actual reading time per fed document (step S3, step S11 and step S6), and the reading time per document that is used in step S13 is set based on the actual reading time that was actually measured as described above. Thus, the reading determination confirmation unit 86 can appropriately determine, in step S13, whether the reading time of the image of the final document is shorter than anticipated by using the reading time per document which gives consideration to changes in the characteristics of the apparatus due to the environment in which the complex machine 1 is installed or aged deterioration.

The configurations and settings shown in the foregoing embodiment are merely examples, and are not intended to limit the present disclosure to the foregoing embodiment. For example, adopted may be a modified example having a configuration where a plurality of documents do not simultaneously exist on the document feeding path, and the final document determination unit 83 does not execute step S12 and the document feed storage processing. In this modified example, in substitute for determining whether the total number of documents is stored in the memory in step S7, as with step S23, the document detection sensor 91 detects whether a document is mounted on the document tray 51. In addition, the final document determination unit 83 determines whether the fed document is not the final document when the document detection sensor 91 determines that a document is mounted on the document tray 51 in step S7.

Moreover, it is also possible to adopt a configuration of not including the reading determination confirmation unit 86 and the reading time measurement unit 87, and simplifying the processing by not executing step S3, step S11, step S6, step S13, and step S14.

Figure 6:
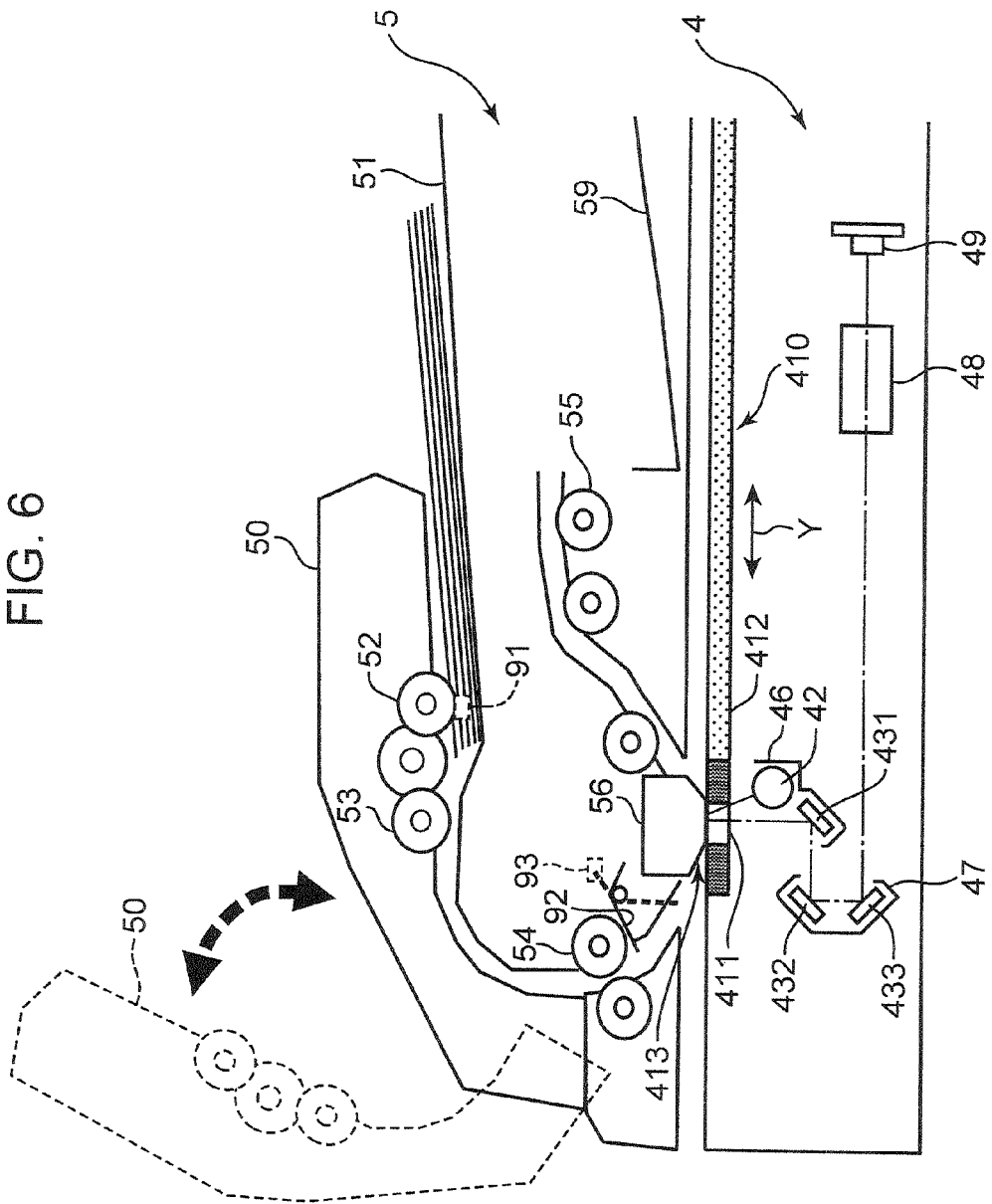
FIG. 6 is a schematic cross section showing a modified embodiment of the image reading unit and the document feeding unit.

Moreover, the actuator 92 is not limited to the configuration of being provided more upstream than the resist roller 54 in the document feeding direction shown in FIG. 2 and, for example, as shown in FIG. 6, may also adopt a configuration of being provided more downstream than the resist roller 54 in the document feeding direction. In line with this, the reading detection sensor 93 is provided at a position that is the same height as the other end of the actuator 92 when one end of the actuator 92 is in a state of being turned downward pursuant to the document feeding operation as shown with the dotted line portion of FIG. 6.

In the case of the arrangement shown in FIG. 2, after the leading edge of the document comes into contact with one end of the actuator 92, there is a possibility that the document will float when the open/close cover 50 is opened before the trailing edge of the document is no longer in contact with the one end of the actuator 92, thereby causing the one end of the actuator 92 to no longer be in contact with the document, and the actuator 92 returning to the state shown with the solid line of FIG. 2. In the foregoing case, the reading detection sensor 93 will erroneously detect that the trailing edge of the document has reached the position of the actuator 92 sooner than normal. Consequently, there is a possibility that the feed detection unit 82 will erroneously detect that the trailing edge of the document has reached the reading position 413 sooner than normal.

Meanwhile, in the case of the arrangement shown in FIG. 6, after the leading edge of the document comes into contact with one end of the actuator 92, even if the open/close cover 50 is opened before the trailing edge of the document is no longer in contact with the one end of the actuator 92, the document will be in a state of being sandwiched by the resist roller 54 and a roller facing the resist roller 54. Thus, the risk of the one end of the actuator 92 returning to a state of becoming difficult to come into contact with the document (state shown with the solid line of FIG. 6) is reduced. Consequently, since the possibility of the reading detection sensor 93 erroneously detecting that the trailing edge of the document has reached the position of the actuator 92 sooner than normal is reduced, it is possible to improve the detection accuracy of the feed detection unit 82 detecting that the trailing edge of the document has reached the reading position 413.

Moreover, information which is indicated when the various signals are a high level or a low level may be configured to indicate a meaning that is opposite to the foregoing embodiment.

Second Embodiment

Figure 7:
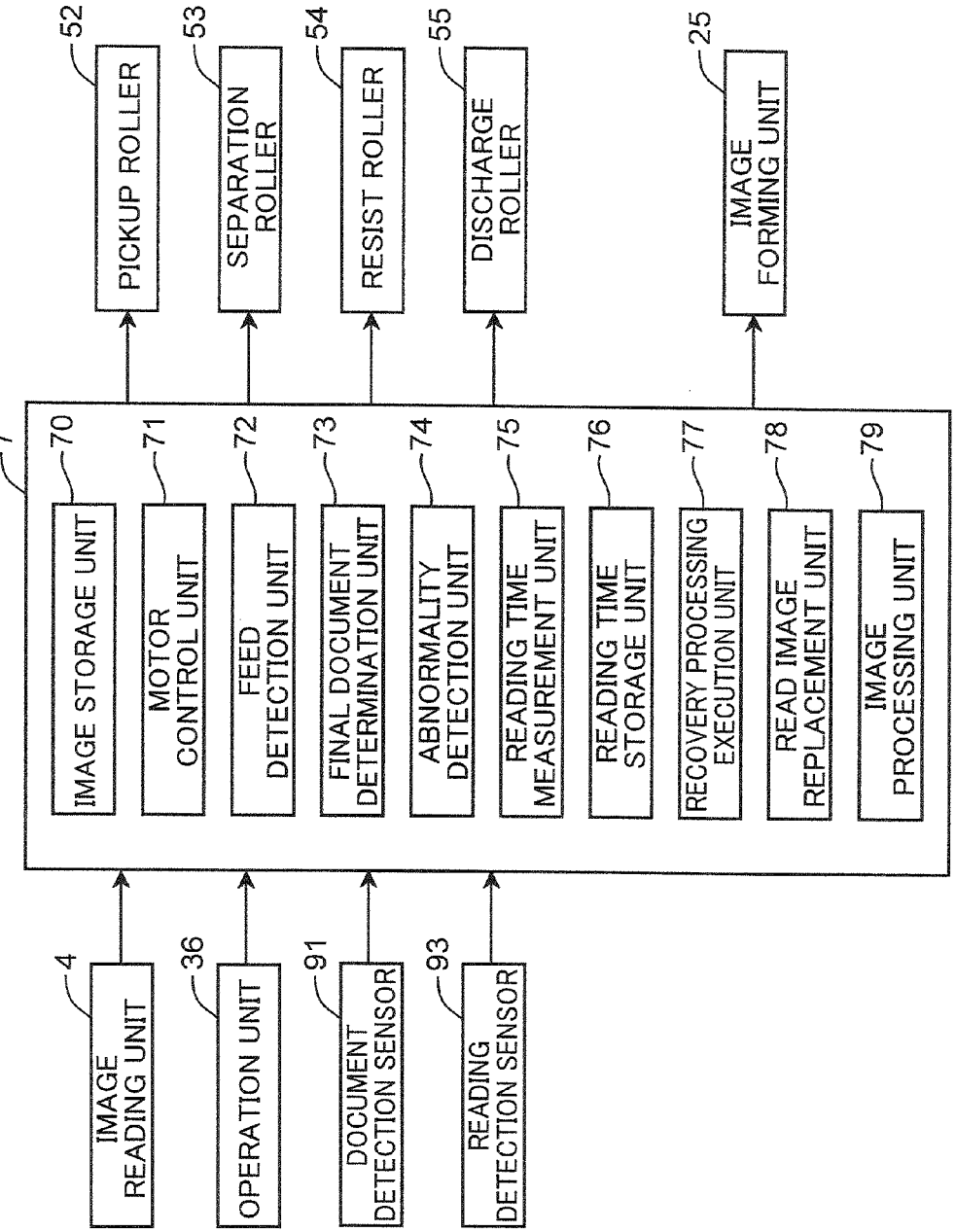
FIG. 7 is a block diagram showing the electrical configuration of the complex machine according to the second embodiment.

The electrical configuration of the complex machine 1 according to the second embodiment is now explained with reference to FIG. 7. The complex machine 1 according to the second embodiment includes the mechanical configuration shown in FIG. 1 and FIG. 2, and additionally includes a controller 7 which governs the operational control of the respective units of the complex machine 1. The controller 7 is configured, for example, from a microcomputer having a CPU and a memory such as a ROM or a RAM, and performs the operational control of the respective units by causing the CPU to execute the various control programs stored in the memory.

The controller 7 is connected, in a mutually communicable manner, to the foregoing image reading unit 4, the operation unit 36, various detection sensors 91, 93, various rollers 52, 53, 54, 55, and the image forming unit 25. Since the configuration other than the controller 7 is the same as the first embodiment, the explanation thereof is omitted.

The controller 7 controls the reading operation of the image of the document using the document feeding unit 5 and the image reading unit 4 by causing the CPU to execute the control programs that function as an image storage unit 70, a motor control unit 71, a feed detection unit 72, a final document determination unit 73, an abnormality detection unit 74, a reading time measurement unit 75, a reading time storage unit 76, a recovery processing execution unit 77, a read image replacement unit 78, and an image processing unit 79.

Here, the motor control unit 71, the feed detection unit 72, the final document determination unit 73, the abnormality detection unit 74 and the reading time measurement unit 75 described above are substantially the same functional units as the motor control unit 81, the feed detection unit 82, the final document determination unit 83, the abnormality detection unit 84 and the reading time measurement unit 87 in the first embodiment described above. The second embodiment can be implemented by adding, to the controller 80 of the first embodiment, a function unit group excluding the same function unit group of the controller 7; that is, by adding the image storage unit 70, the reading time storage unit 76, the recovery processing execution unit 77, the read image replacement unit 78, and the image processing unit 79. Otherwise, the second embodiment can also be implemented according to a configuration excluding the reading determination unit 85 and the reading determination confirmation unit 86 of the controller 80 of the first embodiment; that is, in a mode with the controller 7 as a standalone as shown in FIG. 7.

The image storage unit 70 is configured, for example, from a memory such as a RAM. The image storage unit 70 stores an image of the respective documents read by the image reading unit 4.

The motor control unit 71 outputs a drive signal to the respective motors not shown for driving the various rollers 52, 53, 54, 55, and performs control for rotatably driving the various rollers 52, 53, 54, 55 each at a predetermined speed. Note that each motor is configured, for example, as a stepping motor, and is rotatably driven at a predetermined according to the number of pulses of the drive signal.

The feed detection unit 72 detects that the leading edge or the trailing edge of the document, which is being fed in the feeding path of the document feeding unit 5 by the various rollers 52, 53, 54, 55, has reached the reading position 413. The specific detection mode is the same as the mode explained with reference to the feed detection unit 82 of the first embodiment.

The final document determination unit 73 determines whether the fed document, which is a document that is being fed by the document feeding unit 5, is a final document among the plurality of documents mounted on the document tray 51.

The abnormality detection unit 74 receives, in advance, the setting of a reading time limit that is longer than the paper interval time. The abnormality detection unit 74 detects an occurrence of an abnormality in the document feed when the final document determination unit 73 determines that the fed document is not the final document, and the feed detection unit 72 detects that the trailing edge of the fed document has reached the reading position 413, and the feed detection unit 72 does not detect a leading edge of a subsequent document, which is a document that is fed subsequent to the fed document, has reached the reading position 413 during a period from the detection of the trailing edge of the fed document reaching the reading position 413 until the reading time limit has elapsed.

The reading time measurement unit 75 measures an actual reading time which is a time from the time that the feed detection unit 72 detects that the leading edge of the fed document has reached the reading position 413 to the time that the feed detection unit 72 detects that the trailing edge of the fed document has reached the reading position 413; that is, the time required for reading one fed document.

The reading time storage unit 76 is configured, for example, from a memory such as a RAM. The reading time storage unit 76 stores the actual reading time of the respective documents measured by the reading time measurement unit 75.

The recovery processing execution unit 77 performs reading recovery processing. The reading recovery processing is the processing of guiding a user, when an occurrence of an abnormality is detected by the abnormality detection unit 74, to mount the same documents on the document tray 51 once again by displaying, on the display unit 363, a screen urging the user to once again mount on the document tray 51 a plurality of documents which are the same as the plurality of documents that have been mounted on the document tray 51 before the feeding of documents by the document feeding unit 5 is started. Subsequently, in the reading recovery processing, when a plurality of documents are mounted on the document tray 51, processing is performed for causing the document feeding unit 5 to feed the documents, and causing the image reading unit 4 to read an image of an abnormality-detected document, which is the fed document in which the occurrence of an abnormality has been detected by the abnormality detection unit 74.

The read image replacement unit 78 determines, in case where the reading recovery processing is executed by the recovery processing execution unit 77, whether the image of the abnormality-detected document read in the reading recovery processing is the same as the image corresponding to the abnormality-detected document stored in the image storage unit 70 before the execution of the reading recovery processing. When it is determined that the images are not the same, the read image replacement unit 78 replaces the image corresponding to the abnormality-detected document stored in the image storage unit 70 with the image of the abnormality-detected document read in the reading recovery processing.

Specifically, the read image replacement unit 78 determines whether the actual reading time corresponding to the abnormality-detected document measured by the reading time measurement unit 75 coincides with the actual reading time corresponding to the abnormality-detected document stored in the reading time storage unit 76 when the reading recovery processing is executed by the recovery processing execution unit 77. Subsequently, when the actual reading times coincide, the read image replacement unit 78 determines that the image of the abnormality-detected document read in the reading recovery processing coincides with the image corresponding to the abnormality-detected document stored in the image storage unit 70 before the execution of the reading recovery processing as a result of determining that the length of both images in the feeding direction is the same. Meanwhile, when the actual reading times do not coincide, the read image replacement unit 78 determines that the image of the abnormality-detected document read in the reading recovery processing does not coincide with the image corresponding to the abnormality-detected document stored in the image storage unit 70 before the execution of the reading recovery processing.

The image processing unit 79 performs image processing to the image that was read by the image reading unit 4. As the image processing, for example, exemplified may be correction processing such as shading correction, level correction, or gamma correction, processing treatment such as enlargement or reduction processing of the image or compression processing of image data, and analysis processing of the image density distribution.

Figure 9:
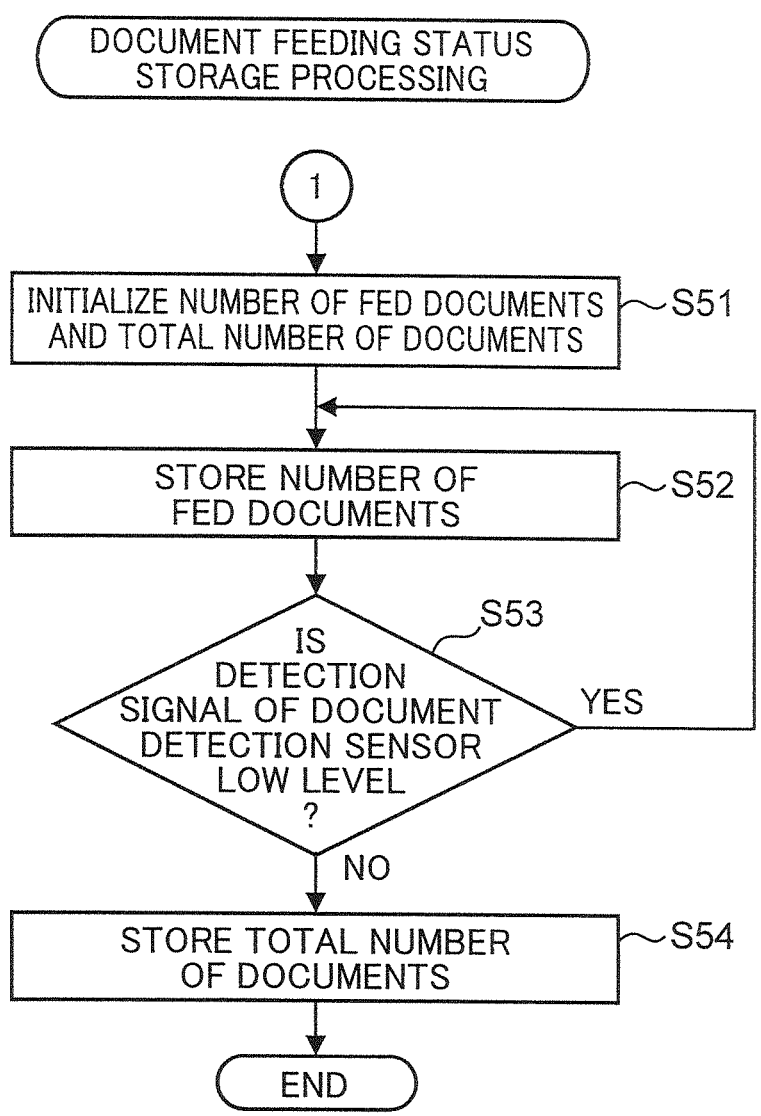
FIG. 9 is a flowchart showing the document feeding status storage processing that is performed during the document feeding operation.
Figure 10:
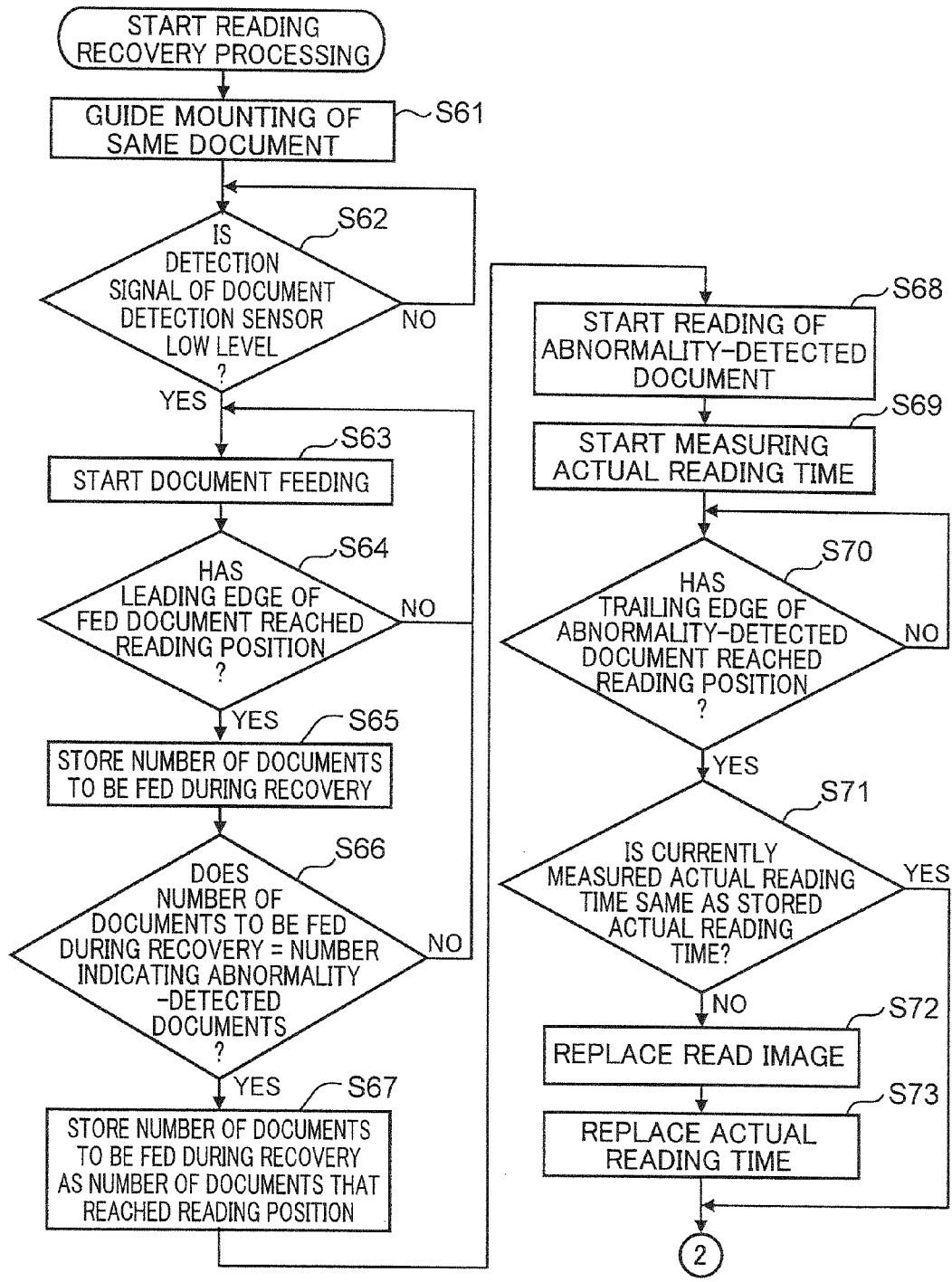
FIG. 10 is a flowchart showing the reading recovery processing.

The flow of the reading operation of the image of the document using the document feeding unit 5 and the image reading unit 4 in the second embodiment is now explained with reference to FIG. 8 to FIG. 10.

Figure 8:
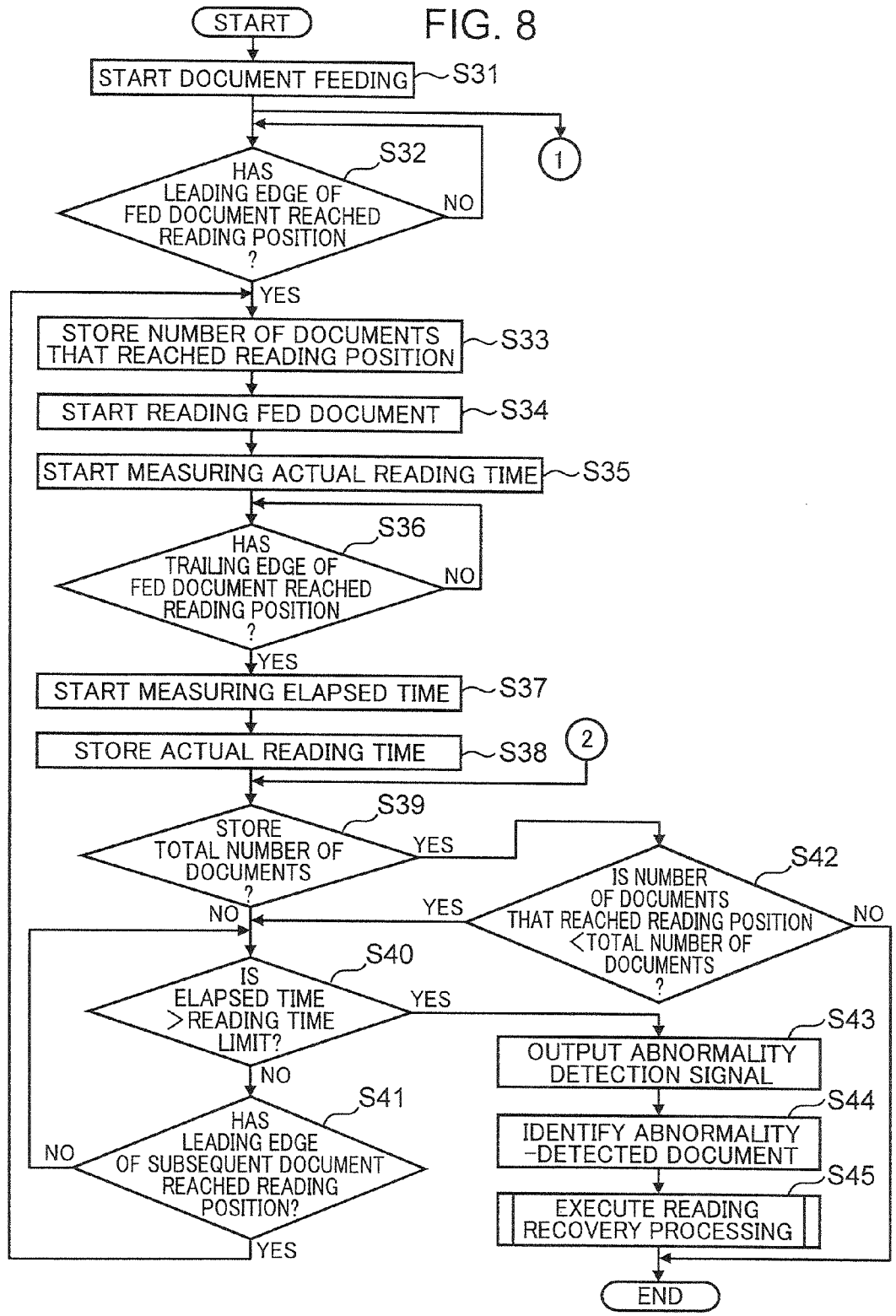
FIG. 8 is a flowchart showing the document feeding operation in the second embodiment.

FIG. 8 is a flowchart showing the reading operation of the image of the document in the second embodiment. FIG. 9 is a flowchart showing the document feeding status storage processing that is performed during the document feeding operation using the document feeding unit 5. FIG. 10 is a flowchart showing an example of the reading recovery processing.

As shown in FIG. 8, when the document reading operation in the ADF reading mode is started by the controller 7, for example, based on the copy function execution command input from the operation unit 36, the motor control unit 71 starts driving the drive motor of the various rollers 52, 53, 54, 55, and starts feeding the uppermost document of the document tray 51 (S31).

After step S31 is executed, the final document determination unit 73 starts the document feeding status storage processing shown in FIG. 9 in parallel with the processing of step S32 onward described later.

When the final document determination unit 73 starts the document feeding status storage processing, the final document determination unit 73 deletes (initializes) the number of fed documents described later and the total number of documents described later if they are stored in the memory (S51). Subsequently, the final document determination unit 73 counts up the number of fed documents each time a document is fed by the pickup roller 52, and stores, in the memory, the number of documents after the foregoing count-up as the number of fed documents (S52). Subsequently, the final document determination unit 73 causes the document detection sensor 91 to detect whether a document is mounted on the document tray 51 (S53).

In step S53, when it is detected that a document is not mounted on the document tray 51 as a result of a low-level detection signal not being output from the document detection sensor 91 (S53; NO); that is, when all documents mounted on the document tray 51 have been fed by the pickup roller 52, the final document determination unit 73 stores, in the memory, the number of fed documents stored in the memory in step S52 as the total number of documents (total number of documents) (S54). In step S53, when it is detected that a document is mounted on the document tray 51 as a result of a low-level detection signal being output from the document detection sensor 91 (S53; YES); that is, when a document that has not been fed by the pickup roller 52 exists in the document tray 51, the final document determination unit 73 counts the number of documents that were fed by returning to step S52.

Returning to FIG. 8, after step S31 is executed, during the period until the feed detection unit 72 detects that the leading edge of the fed document, which is a document that is being fed, reaches the reading position 413 (S32; NO), the document is fed by the motor control unit 71 driving the drive motor of the various rollers 52, 53, 54, 55. Subsequently, when the feed detection unit 72 detects that the leading edge of the fed document, which is a document that is being fed, reaches the reading position 413 (S32; YES), the abnormality detection unit 74 counts up the number of documents that reached the reading position 413, and stores, in the memory, the number of documents after the foregoing count-up as the number of documents that reached the reading position (S33). Moreover, the controller 7 causes the image reading unit 4 to start reading the image of the fed document (S34). Note that the controller 7 causes the image reading unit 4 to store, in the image storage unit 70, the image read by the reading position 413, one line worth at a time.

The reading time measurement unit 75 uses, for example, a timer circuit or the like not shown to start measuring the elapsed time from the time that the leading edge of the fed document reaches the reading position 413 in step S32. In other words, the reading time measurement unit 75 thereby starts measuring the actual reading time of the fed document (S35).

When the feed detection unit 72 detects that the trailing edge of the fed document has reached the reading position 413 (S36; YES), the abnormality detection unit 74 uses, for example, a timer circuit or the like not shown to start measuring the elapsed time from the time that the trailing edge of the fed document has reached the reading position 413 in step S36 (S37). Moreover, the reading time measurement unit 75 ends the measurement of the elapsed time which was started in step S35 at the point in time it is detected that the trailing edge of the fed document has reached the reading position 413, and stores the elapsed time of the measurement result as the actual reading time of the fed document in the reading time storage unit 76 (S38).

Subsequently, when the total number of documents is not stored in the memory based on the document feeding status storage processing which is being performed in parallel (S39; NO), the final document determination unit 73 determines that the fed document is not the final document since the processing of step S54 is not being performed in parallel; that is, since it is a state in which the document is detected as being mounted on the document tray 51 in step S53 (FIG. 9) (S53; YES).

In step S39, when the total number of documents is stored in the memory based on the document feeding status storage processing which is being performed in parallel (S39; YES); that is, even when all documents mounted on the document tray 51 have been fed by the pickup roller 52, there are cases when the number of documents that reached the reading position stored in the memory is less than the total number of documents stored in the memory (S42; YES). For example, this is a case where, when the size of the document is small, and, while all documents mounted on the document tray 51 have been fed by the pickup roller 52, the document that is being fed reaches the reading position 413 in a state where a plurality of documents exist on the feeding path. Accordingly, the final document determination unit 73 also determines that the fed document is not the final document in the foregoing case (S42; YES).

Meanwhile, the final document determination unit 73 determines that the fed document is the final document when the total number of documents is stored in the memory based on the document feeding status storage processing that is being performed in parallel in step S39 (S39; YES), and the number of documents that reached the reading position stored in the memory has reached the total number of documents stored in the memory (S42; NO).

When the final document determination unit 73 determines that the fed document is the final document (S42; NO), the controller 7 ends the reading processing of the image of the document.

Meanwhile, when the final document determination unit 73 determines that the fed document is not the final document (S39; NO or S42; YES), the abnormality detection unit 74 determines whether the measurement value of the elapsed time for which measurement was started in step S37 exceeds a predetermined reading time limit (S40).

When the abnormality detection unit 74 detects, in step S40, that the measurement value of the elapsed time for which measurement was started in step S37 does not exceed a predetermined reading time limit (S40; NO), the determination processing of step S40 is performed once again when the feed detection unit 72 does not detect that the leading edge of a subsequent document, which is a document subsequent to the fed document, has reached the reading position 413 (S41; NO). When it is determined in step S40 that the measurement value of the elapsed time for which measurement was started in step S37 does not exceed a predetermined reading time limit (S40; NO) and, in step S41, the feed detection unit 72 detects that the leading edge of the subsequent document has reached the reading position 413 (S41; YES), the controller 7 advances the processing to step S33 with the subsequent document (document that is subsequent to the fed document), in which the leading edge reaching the reading position is detected in step S41, as the fed document.

Meanwhile, when the abnormality detection unit 74 determines, in step S40, that the measurement value of the elapsed time for which measurement was started in step S37 exceeds a predetermined reading time limit (S40; YES), it is determined that an abnormality has occurred during the reading of the image of the fed document. Subsequently, the abnormality detection unit 74 outputs a detection signal indicating the occurrence of an abnormality (S43).

Here, the number of documents that reached the reading position stored in the memory in step S33 may be considered as indicating which document among the plurality of documents mounted on the document tray 51 corresponds to the fed document that is subjected to the abnormality is detected by the abnormality detection unit 74 in step S43. Thus, the abnormality detection unit 74 stores, in the memory, the number of documents that reached the reading position as information for identifying the abnormality-detected document, and thereby identifies the abnormality-detected document (S44).

When step S44 is executed, the controller 7 causes the recovery processing execution unit 77 to execute the reading recovery processing described later (S45), and ends the reading operation of the image of the document using the document feeding unit 5 and the image reading unit 4.

The reading recovery processing executed by the recovery processing execution unit 77 is now explained in detail. As shown in FIG. 10, when the recovery processing execution unit 77 starts the reading recovery processing of step S45 (FIG. 8), it displays, on the display unit 363, a screen urging the user to once again mount on the document tray 51 a plurality of documents which are the same as the plurality of documents that have been mounted on the document tray 51 before the feeding of the documents is started by the document feeding unit 5 in the reading processing in which an abnormality occurred. Consequently, the user is guided to once again mount the same plurality of documents on the document tray 51 (S61).

Subsequently, the recovery processing execution unit 77 causes the document detection sensor 91 to detect whether a document is mounted on the document tray 51 (S62). When it is detected that a document is mounted on the document tray 51 as a result of a low-level detection signal being output from the document detection sensor 91 (S62; YES), the feeding of the uppermost document of the document tray 51 is started as in step S31 (FIG. 8) based on the determination that the same plurality of documents have been once again mounted on the document tray 51 (S63).

Each time the feed detection unit 72 detects that the leading edge of the fed document, which is a document being fed, has reached the reading position 413 (S64; YES), the recovery processing execution unit 77 counts up the number of documents in which the leading edge thereof reached the reading position 413, and stores, in the memory, the number of documents after the foregoing count-up as the number of documents to be fed during recovery (S65).

Subsequently, the recovery processing execution unit 77 determines whether the number of documents to be fed during recovery stored in the memory in step S65 coincides with the number of documents indicated by the information for identifying the abnormality-detected document stored in the memory in step S44 (FIG. 8). In other words, the recovery processing execution unit 77 thereby determines whether the fed document is the abnormality-detected document (S66).

When the recovery processing execution unit 77 determines, in step S66, that the number of documents to be fed during recovery does not coincide with the number of documents indicated by the information for identifying the abnormality-detected document; that is, that the fed document is not the abnormality-detected document (S66; NO), the recovery processing execution unit 77 returns to step S63 without causing the image reading unit 4 to read the fed document, and starts feeding the document that is subsequent to the fed document.

Meanwhile, when the recovery processing execution unit 77 determines, in step S66, that the number of documents to be fed during recovery coincides with the number of documents indicated by the information for identifying the abnormality-detected document; that is, that the fed document is the abnormality-detected document (S66; YES), the recovery processing execution unit 77 stores, in the memory, the number of documents to be fed during recovery stored in the memory in step S65 as the number of documents that reached the reading position (S67), and causes the image reading unit 4 to start reading the image of the abnormality-detected document (S68). Note that the recovery processing execution unit 77 stores, in the memory, the image of the abnormality-detected document read at the reading position 413 by the image reading unit 4, one line worth at a time.

The reading time measurement unit 75 uses, for example, a timer circuit or the like not shown to start measuring the elapsed time from the time that the leading edge of the abnormality-detected document reaches the reading position 413 in step S64. In other words, the reading time measurement unit 75 thereby starts measuring the actual reading time of the abnormality-detected document (S69).

When the feed detection unit 72 detects that the trailing edge of the abnormality-detected document has reached the reading position 413 (S70; YES), the read image replacement unit 78 determines whether the elapsed time measured by the reading time measurement unit 75 at the time of the foregoing detection; that is, whether the actual reading time of the abnormality-detected document in the reading recovery processing coincides with the actual reading time of the abnormality-detected document stored in the reading time storage unit 76 in step S38 (FIG. 8) before the execution of the reading recovery processing (S71).

Subsequently, when the read image replacement unit 78 determines, in step S71, that the actual reading time of the abnormality-detected document in the reading recovery processing does not coincide with the actual reading time of the abnormality-detected document stored in the reading time storage unit 76 (S41; NO), the read image replacement unit 78 replaces the image corresponding to the abnormality-detected document stored in the image storage unit 70 before the execution of the reading recovery processing with the image of the abnormality-detected document read by the image reading unit 4 and stored in the memory in the reading recovery processing (S72).

Moreover, upon executing step S72, the read image replacement unit 78 replaces the actual reading time corresponding to the abnormality-detected document stored in the reading time storage unit 76 with the elapsed time measured by the reading time measurement unit 75 at the point in time that it is detected that the trailing edge of the abnormality-detected document has reached the reading position 413 in step S70; that is, with the actual reading time of the abnormality-detected document in the reading recovery processing (S73).

Subsequently, after executing step S73, the recovery processing execution unit 77 advances the processing to step S39 (FIG. 8), and causes the image of documents from the document that is subsequent to the abnormality-detected document, which are the remaining documents which have not yet been read, to be read.

Meanwhile, when the read image replacement unit 78 determines, in step S71, that the actual reading time of the abnormality-detected document in the reading recovery processing coincides with the actual reading time of the abnormality-detected document stored in the reading time storage unit 76 (S71; YES), the read image replacement unit 78 advances the processing to step S39 without replacing the image corresponding to the abnormality-detected document stored in the image storage unit 70 before the execution of the reading recovery processing.

In other words, the complex machine 1 according to this embodiment configures an image forming apparatus according to the present disclosure by including the document tray 51, the image reading unit 4, the document detection sensor 91, the actuator 92, the reading detection sensor 93, the document feeding unit 5, the image storage unit 70, the feed detection unit 72, the final document determination unit 73, the abnormality detection unit 74, the reading time measurement unit 75, the reading time storage unit 76, the recovery processing execution unit 77, and the read image replacement unit 78.

Meanwhile, when the open/close cover 50 is opened after the leading edge of the fed document reaches the reading position 413 and the image reading unit 4 starts reading the image of the fed document, there are cases when a problem occurs in the reading of the document image. For example, there may be cases where the resist roller 54 will vibrate and cause the document to shift in a direction that is different from the normal feeding direction and be fed to the reading position 413, or, while the fed document has been properly fed to the reading position 413, light creeps in from the outside of the apparatus onto the reading position 413, and thus disable the proper reading of the image of the document by the image reading unit 4.

According to the configuration of the foregoing embodiment, in cases where the final document determination unit 73 determines that the fed document is not the final document (step S39; NO or step S42; YES), as described above, when the leading edge of the subsequent document does not reach the reading position 413 during the period until the reading time limit has elapsed from the time that it is detected that the trailing edge of the fed document has reached the reading position 413 as a result of the open/close cover 50 remaining in an open state during the reading of the image of the fed document (step S41; NO, step S40; YES), the abnormality detection unit 74 detects the occurrence of an abnormality (step S43). In other words, even without having to provide an open/close detection sensor for detecting the open/close state of the open/close cover 50, as described above, it is possible to appropriately detect, as a state in which an abnormality has occurred, a state in which the image of the document cannot be read properly.

When the abnormality detection unit 74 detects that an abnormality has occurred (step S43), the reading recovery processing is executed by the recovery processing execution unit 77 (step S45). Subsequently, when the actual reading time corresponding to the abnormality-detected document measured by the reading time measurement unit 75 does not coincide with the actual reading time corresponding to the abnormality-detected document stored in the reading time storage unit 76 in the reading recovery processing (step S71; NO), the image of the abnormality-detected document read in the reading recovery processing is treated as not being the same as the image corresponding to the abnormality-detected document stored in the image storage unit 70 before the execution of the reading recovery processing. In the foregoing case, the image corresponding to the abnormality-detected document stored in the image storage unit 70 is replaced with the image of the abnormality-detected document read in the reading recovery processing (step S72).

In other words, based on step S71, it is possible to appropriately determine whether the images of the abnormality-detected document read before and after the occurrence of the abnormality are the same depending on whether the actual reading times that the abnormality-detected document was read before and after the detection of the occurrence of the abnormality coincide; that is, whether the lengths of the images of the read abnormality-detected document coincide.

Moreover, there are cases where it is detected that the trailing edge of the fed document has reached the reading position 413 sooner than normal as a result of the open/close cover 50 being opened during the reading of the image of the document, for example, thereby causing the resist roller 54 to vibrate and causing the document to shift in a direction that is different from the normal feeding direction and be fed to the reading position 413. Even in cases when the occurrence of an abnormality is detected in a state where the reading of the image of the fed document is still midway, by executing the reading recovery processing, it is possible to promptly re-read the image of the documents from the fed document, which is the abnormality-detected document, onward.

When the image of the abnormality-detected document read in the reading recovery processing is not the same as the image corresponding to the abnormality-detected document stored in the image storage unit 70, it can be considered that the reading of the image of the abnormality-detected document before the detection of the occurrence of an abnormality was not completed normally. In the foregoing case, it is possible to re-store, in the image storage unit 70, the image of the abnormality-detected document read in the reading recovery processing. It is thereby possible to reliably read the image of a plurality of documents and store the image in the image storage unit 70.

In the second embodiment explained above, the following modified embodiment may be adopted.

In the foregoing example, the read image replacement unit 78 performs, in step S71, the processing of determining whether the actual reading time corresponding to the abnormality-detected document satisfies (a first condition) of coinciding the actual reading time corresponding to the abnormality-detected document stored in the reading time storage unit 76. In addition to the determination processing of the foregoing first condition, additional determination processing based on image processing may also be performed. For example, in addition to performing the image processing by the image processing unit 79 to the image of the abnormality-detected document read in step S68 to step S70, image processing is performed by the image processing unit 79 also to the image of the abnormality-detected document stored in the image storage unit 70 before the occurrence of an abnormality is detected in step S43. Subsequently, processing of determining whether (a second condition) information related to the two images that have been subjected to the image processing coincides is additionally performed. Note that information related to the images that have been subjected to the image processing is, for example, the data size of the image after the compression processing when compression processing is performed as the image processing, and the image density distribution as the result of the analysis when analysis processing of the image density distribution is performed as the image processing.

Subsequently, in step S71, when the foregoing first condition and second condition are both satisfied, the processing is advanced to step S39 without replacing the image corresponding to the abnormality-detected document stored in the image storage unit 70 with the image of the abnormality-detected document read in step S68 to step S70. Meanwhile, when the first condition and/or the second condition is not satisfied, the processing is advanced to step S72, and the image corresponding to the abnormality-detected document stored in the image storage unit 70 is replaced with the image of the abnormality-detected document read in step S68 to step S70.

According to the foregoing configuration, based on the changed step S71, it is determined whether the image of the abnormality-detected document before the occurrence of the abnormality is the same as the image of the abnormality-detected document after the occurrence of the abnormality, on the condition of satisfying both the first condition and the second condition. Thus, the accuracy of determination can be improved in comparison to the case of making the determination on the condition of only satisfying the first condition.

As another modified embodiment, the foregoing determination may also be made only by depending on the second condition described above. That is, it is also possible to adopt a configuration of not including the reading time measurement unit 75 and the reading time storage unit 76, and simplifying the processing by not executing step S35, step S38, step S69 and step S73. In line with this, in substitute for step S71 described above, the read image replacement unit 78 causes the image processing unit 79 to perform image processing to the image of the abnormality-detected document read in step S68 to step S70, and also causes the image processing unit 79 to perform image processing to the image of the abnormality-detected document stored in the image storage unit 70 before the occurrence of the abnormality is detected in step S43. Subsequently, whether the information related to the two images that have been subjected to the image processing coincides is determined.

According to step S71 of this other modified embodiment, it is possible to appropriately determine whether the images of the abnormality-detected document read before and after the occurrence of the abnormality are the same depending on whether the information related to the image, which has been subjected to the image processing, of the abnormality-detected document read before the occurrence of the abnormality (for example, data size after performing compression processing to the read image, the density distribution of the read image, or the like) coincides with information related to the image, which has been subjected to the image processing, of the abnormality-detected document read after the occurrence of the abnormality.

As yet another modified embodiment, adopted may be a configuration where a plurality of documents do not simultaneously exist on the document feeding path. The final document determination unit 73 does not execute step S42 and the document feed storage processing (FIG. 9) and, in substitute for determining whether the total number of documents is stored in the memory in step S39, as with step S53, the document detection sensor 91 detects whether a document is mounted on the document tray 51. In addition, the final document determination unit 73 determines whether the fed document is not the final document when the document detection sensor 91 determines that a document is mounted on the document tray 51 in step S39.

A complex machine was explained as an example of the image forming apparatus according to the present disclosure in the first and second embodiments described above. The present disclosure can also be applied to an image forming apparatus such as a printer, a copier, a scanner, or a FAX machine.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

The invention claimed is:

1. An image reading apparatus, comprising:
a mounting part on which documents are mounted;
an image reading unit for reading an image of a document at a predetermined reading position;
a document feeding unit for feeding, one document at a time, the documents mounted on the mounting part at a predetermined paper interval time, and discharging the documents via the reading position;
an open/close cover for openably/closeably covering a feeding path on which the documents are fed by the document feeding unit;
a final document determination unit for determining whether a fed document, which is the document that is being fed by the document feeding unit, is a final document among the documents mounted on the mounting part;
a feed detection unit for detecting whether a leading edge or a trailing edge of the fed document has reached the reading position;
an abnormality detection unit for detecting an occurrence of an abnormality in a case where a reading time limit, which is longer than the paper interval time, is set in advance, the final document determination unit determines that the fed document is not the final document, and the feed detection unit detects that the trailing edge of the fed document has reached the reading position, and when the feed detection unit does not detect that a leading edge of a subsequent document, which is a document that is fed subsequent to the fed document, has reached the reading position during a period from the detection of the trailing edge of the fed document reaching the reading position until the reading time limit has elapsed; and
a reading determination unit for determining that the reading of the image of the fed document by the image reading unit is complete in a case where the final document determination unit determines that the fed document is not the final document, and the feed detection unit detects that the leading edge of the fed document has reached the reading position, and when the feed detection unit detects that the leading edge of the subsequent document has reached the reading position without the abnormality detection unit detecting any abnormality.

2. The image reading apparatus according to claim 1, further comprising:
a reading determination confirmation unit for urging a confirmation input on whether the reading of the image of the fed document by the image reading unit has ended in a failure,
wherein the reading determination confirmation unit urges the confirmation input when:
the final document determination unit determines that the fed document is the final document, and
an elapsed time from the time that the feed detection unit detects that the leading edge of the fed document has reached the reading position to the time that the feed detection unit detects that the trailing edge of the fed document has reached the reading position is shorter than a predetermined reading time per document.

3. The image reading apparatus according to claim 2, further comprising:
a reading time measurement unit for measuring an actual reading time which is a time from the time that the feed detection unit detects that the leading edge of the fed document has reached the reading position to the time that the feed detection unit detects that the trailing edge of the fed document has reached the reading position,
wherein the unit reading time per document is set based on the actual reading time measured by the reading time measurement unit.

4. The image reading apparatus according to claim 1, further comprising:
an image storage unit for storing the image of the document read by the image reading unit;
a recovery processing execution unit for executing, when an occurrence of an abnormality is detected by the abnormality detection unit, reading recovery processing of guiding a user to once again mount on the mounting part a plurality of documents which are the same as a plurality of documents that have been mounted on the mounting part before the feeding of documents by the document feeding unit is started, causing the document feeding unit to feed the documents, and causing the image reading unit to read an image of an abnormality-detected document, which is the fed document in which the occurrence of an abnormality has been detected by the abnormality detection unit; and
a read image replacement unit for determining whether the image of the abnormality-detected document read in the reading recovery processing is the same as the image corresponding to the abnormality-detected document stored in the image storage unit before the execution of the reading recovery processing, and, when it is determined that the images are not the same, replacing the image corresponding to the abnormality-detected document stored in the image storage unit with the image of the abnormality-detected document read in the reading recovery processing.

5. The image reading apparatus according to claim 4, further comprising:
a reading time measurement unit for measuring an actual reading time which is a time from the time that the feed detection unit detects that the leading edge of the fed document has reached the reading position to the time that the feed detection unit detects that the trailing edge of the fed document has reached the reading position; and
a reading time storage unit for storing the actual reading time measured by the reading time measurement unit,
wherein, when the reading recovery processing is executed by the recovery processing execution unit,
the read image replacement unit:
determines that the image of the abnormality-detected document read in the reading recovery processing is the same as the image corresponding to the abnormality-detected document stored in the image storage unit before the execution of the reading recovery processing when the actual reading time corresponding to the abnormality-detected document measured by the reading time measurement unit coincides with the actual reading time corresponding to the abnormality-detected document stored in the reading time storage unit, and determines that the image of the abnormality-detected document read in the reading recovery processing is not the same as the image corresponding to the abnormality-detected document stored in the image storage unit before the execution of the reading recovery processing when the actual reading time corresponding to the abnormality-detected document measured by the reading time measurement unit does not coincide with the actual reading time corresponding to the abnormality-detected document stored in the reading time storage unit.

6. The image reading apparatus according to claim 4, further comprising:

an image processing unit for performing image processing to the image read by the image reading unit, wherein the read image replacement unit:

determines that the image of the abnormality-detected document read in the reading recovery processing is the same as the image corresponding to the abnormality-detected document stored in the image storage unit before the execution of the reading recovery processing when information related to the image of the abnormality-detected document read in the reading recovery processing and subjected to the image processing coincides with information related to the image corresponding to the abnormality-detected document stored in the image storage unit and subjected to the image processing, and determines that the image of the abnormality-detected document read in the reading recovery processing is not the same as the image corresponding to the abnormality-detected document stored in the image storage unit before the execution of the reading recovery processing when information related to the image of the abnormality-detected document read in the reading recovery processing and subjected to the image processing does not coincide with information related to the image corresponding to the abnormality-detected document stored in the image storage unit and subjected to the image processing.

7. The image reading apparatus according to claim 4, further comprising:

a reading time measurement unit for measuring an actual reading time which is a time from the time that the feed detection unit detects that the leading edge of the fed document has reached the reading position to the time that the feed detection unit detects that the trailing edge of the fed document has reached the reading position;

a reading time storage unit for storing the actual reading time measured by the reading time measurement unit; and an image processing unit for performing image processing to the image read by the image reading unit, wherein, when the reading recovery processing is executed by the recovery processing execution unit, the read image replacement unit:

determines that the image of the abnormality-detected document read in the reading recovery processing is the same as the image corresponding to the abnormality-detected document stored in the image storage unit before the execution of the reading recovery processing when the following two conditions are both satisfied:

a first condition in which the actual reading time corresponding to the abnormality-detected document measured by the reading time measurement unit coincides with the actual reading time corresponding to the abnormality-detected document stored in the reading time storage unit; and a second condition in which information related to the image of the abnormality-detected document read in the reading recovery processing and subjected to the image processing coincides with information related to the image corresponding to the abnormality-detected document stored in the image storage unit and subjected to the image processing, and determines that the image of the abnormality-detected document read in the reading recovery processing is not the same as the image corresponding to the abnormality-detected document stored in the image storage unit before the execution of the reading recovery processing when either the first condition or the second condition is not satisfied.

8. An image forming apparatus, comprising:

the image reading apparatus according to claim 1; and an image forming unit for forming an image on recording paper based on an image read by the image reading unit of the image reading apparatus.

9. An image reading apparatus, comprising:

a mounting part on which documents are mounted;

an image reading unit for reading an image of a document at a predetermined reading position;

an image storage unit for storing the image of the document read by the image reading unit;

a document feeding unit for feeding, one document at a time, the documents mounted on the mounting part at a predetermined paper interval time, and discharging the documents via the reading position;

an open/close cover for openably/closeably covering a feeding path on which the documents are fed by the document feeding unit;

a final document determination unit for determining whether a fed document, which is the document that is being fed by the document feeding unit, is a final document among the documents mounted on the mounting part;

a feed detection unit for detecting whether a leading edge or a trailing edge of the fed document has reached the reading position;

an abnormality detection unit for detecting an occurrence of an abnormality in a case where a reading time limit, which is longer than the paper interval time, is set in advance, the final document determination unit determines that the fed document is not the final document, and the feed detection unit detects that the trailing edge of the fed document has reached the reading position, and when the feed detection unit does not detect that a leading edge of a subsequent document, which is a document that is fed subsequent to the fed document, has reached the reading position during a period from the detection of the trailing edge of the fed document reaching the reading position until the reading time limit has elapsed; and a recovery processing execution unit for executing, when an occurrence of an abnormality is detected by the abnormality detection unit, reading recovery processing of guiding a user to once again mount on the mounting part a plurality of documents which are the same as a plurality of documents that have been mounted on the mounting part before the feeding of documents by the document feeding unit is started, causing the document feeding unit to feed the documents, and causing the image reading unit to read an image of an abnormality-detected document, which is the fed document in which the occurrence of an abnormality has been detected by the abnormality detection unit; and a read image replacement unit for determining whether the image of the abnormality-detected document read in the reading recovery processing is the same as the image corresponding to the abnormality-detected document stored in the image storage unit before the execution of the reading recovery processing, and, when it is determined that the images are not the same, replacing the image corresponding to the abnormality-detected document stored in the image storage unit with the image of the abnormality-detected document read in the reading recovery processing.

* * * * *